US00RE41823E

(19) United States
(12) Reissued Patent
Miwa et al.

(10) Patent Number: US RE41,823 E
(45) Date of Reissued Patent: Oct. 19, 2010

(54) LEAK CHECK FOR FUEL VAPOR PURGE SYSTEM

(75) Inventors: Makoto Miwa, Kariya (JP); Syujiro Morinaga, Takahama (JP); Yoshinori Maegawa, Obu (JP); Keiji Wakahara, Inazawa (JP)

(73) Assignee: DENSO Corporation, Kariya (JP)

(21) Appl. No.: 11/798,919

(22) Filed: May 17, 2007

Related U.S. Patent Documents

Reissue of:
(64) Patent No.: 6,892,712
Issued: May 17, 2005
Appl. No.: 10/231,065
Filed: Aug. 30, 2002

(30) Foreign Application Priority Data

Sep. 11, 2001 (JP) ..... 2001-274767
Sep. 11, 2001 (JP) ..... 2001-274768

(51) Int. Cl.
*F02M 33/02* (2006.01)

(52) U.S. Cl. ..... 123/520; 123/198 D
(58) Field of Classification Search ..... 123/516, 123/518, 519, 520, 198 D, 198 DB; 73/49.1–49.3
See application file for complete search history.

(56) References Cited

U.S. PATENT DOCUMENTS 5,263,462 A 11/1993 Reddy
5,295,472 A 3/1994 Otsuka et al.
5,297,529 A 3/1994 Cook et al.
5,327,873 A 7/1994 Ohuchi et al.
5,347,971 A 9/1994 Kobayashi et al.
5,467,641 A * 11/1995 Williams et al. ..... 73/49.7
5,679,890 A 10/1997 Shinohara et al.
5,735,252 A 4/1998 Blumenstock
5,890,474 A 4/1999 Schnaibel
5,911,209 A 6/1999 Kouda et al.
6,089,081 A 7/2000 Cook et al.
6,182,642 B1 2/2001 Ohkuma
6,253,743 B1 7/2001 Hyodo et al.
6,354,143 B1 3/2002 Isobe et al.
6,363,919 B1 4/2002 Isobe et al.
6,435,164 B1 8/2002 Kaiser et al.
6,539,927 B2 4/2003 Fabre
6,557,401 B2 5/2003 Ito
6,834,535 B2 * 12/2004 Kano et al. ..... 73/49.7
6,848,298 B2 * 2/2005 Miyahara et al. ..... 73/49.2

FOREIGN PATENT DOCUMENTS

JP A-11-351077 12/1999
JP 11-351077 12/1999

OTHER PUBLICATIONS

Office Action mailed Jul. 29, 2009 in corresponding Japanese Application No. 2001–274768 with an at least partial English–language translation thereof.

* cited by examiner

*Primary Examiner*—Thomas N Moulis
(74) *Attorney, Agent, or Firm*—Nixon & Vanderhye, PC

(57) ABSTRACT

A leak check system executes a leak check processing. In the leak check processing, the system closes a canister valve and a purge valve to close the fuel vapor purge system. Then, the system detects and monitors a pressure in the fuel vapor purge system. During the leak check processing, the system detects a rapid change of the pressure that is caused by a deformation of a wall of a fuel tank. The system cancels or suspends the processing to avoid erroneous detection of the leak. If the leak check is canceled, the system opens the canister valve to open the fuel vapor purge system.

30 Claims, 16 Drawing Sheets

LEAK CHECK FOR FUEL VAPOR PURGE SYSTEM

Matter enclosed in heavy brackets [ ] appears in the original patent but forms no part of this reissue specification; matter printed in italics indicates the additions made by reissue.

CROSS REFERENCE TO RELATED APPLICATION

This application is based on Japanese Patent Applications No. 2001-274767 filed on Sep. 11, 2001 and No. 2001-274768 filed on Sep. 11, 2001 the contents of which are incorporated herein by reference.

BACKGROUND OF THE INVENTION

1. Field of the Invention

The present invention relates to a fuel vapor purge system, and more particularly, an apparatus and method of detecting a leak in the fuel vapor purge system.

2. Related Art

According to a conventional fuel vapor purge system, fuel vapor generated from a fuel tank is stored in an active carbon canister. The fuel vapor stored in the active carbon canister is purged to an intake path of an engine and combusted by the engine when a predetermined condition is satisfied. A purge valve is provided between the active carbon canister and the intake path to thereby control an amount of the fuel vapor to be purged. The path is provided with a canister valve.

It is requested for a fuel vapor purge system to check presence or absence of a leak. For example, by hermetically closing a portion of the fuel vapor purge system and monitoring pressure in the hermetically closed path, the leak of the hermetically closed path can be detected. For example, by closing the purge valve and the canister valve, a path including a fuel tank, the canister and a plurality pipes can hermetically be closed. For example, the pressure in the hermetically closed path can be monitored by a sensor for detecting pressure in the fuel tank. Such a leak check can be carried out in operating the engine or when the engine is stopped. U.S. Pat. No. 5,263,462 discloses a leak check which is carried out when the engine is being stopped.

Various new problems are posed in the fuel vapor purge system which can hermetically be closed.

For example, under a state in which the system is hermetically closed, rapid deformation of the fuel tank brings about rapid change in pressure in the fuel tank. Therefore, there is a concern of causing an error in the leak check. Particularly, a fuel tank made of resin is more liable to deform than a fuel tank made of a metal plate. The deformation of the tank may be brought about by a pressure difference needed for the leak check. Therefore, it is also conceivable that the deformation of the tank is brought about at each leak check.

For example, according to the fuel vapor purge system which can hermetically be closed, unpreferable pressure may be maintained. For example, excessive positive pressure or excessive negative pressure is maintained in the fuel tank. Such an excessive pressure exposes a component of the fuel vapor purge system to a severe pressure difference over a long period of time to thereby bring about deformation or deterioration in function. For example, an excessive pressure difference is operated to a fuel tank over a long period of time. In other aspect, negative pressure hampers the leak of the fuel vapor from the fuel vapor purge system to the atmosphere. Therefore, it is preferable to maintain inside of the fuel vapor purge system under negative pressure.

SUMMARY OF THE INVENTION

The present invention provides an improved fuel vapor purge system.

It is one object of the invention to promote reliability of leak check in a fuel vapor purge system.

It is another object of the invention to prevent error of leak check caused by deformation of a fuel tank.

It is still another object of the invention to promote reliability of the fuel vapor purge system.

It is another object of the invention to prevent a fuel vapor purge system from being maintained under unpreferable pressure.

It is still another object of the invention to prevent the fuel vapor purge system from being maintained continuously under positive pressure after an engine has been stopped.

According to an aspect of the invention, leak check is cancelled or suspended by erroneous avoiding means when a pressure of a fuel vapor purge system detected by pressure detecting means is rapidly changed when checking a leak by leak checking means. Thereby, it can be prevented to erroneously determine presence or absence of the leak by being influenced by a change in the pressure by deformation of a fuel tank. Thereby, reliability of leak check can be promoted.

The pressure in checking the leak may be restricted in a pressure range by which deformation of the fuel tank is not brought about. In this case, it is effective to restrict the pressure in accordance with a detected value related to temperature of the fuel tank.

In the case in which deformation of the fuel tank is brought about when the pressure of the fuel vapor purge system is rapidly changed in checking the leak, a restricted value may be corrected in a direction of approaching the atmospheric pressure. At a successive time of checking the leak, the pressure of the fuel vapor purge system can be restricted in the pressure range by which deformation of the fuel tank is not brought about and deformation of the fuel tank can be prevented.

When leak check is stopped by detecting a rapid change in the pressure of the fuel vapor purge system by deformation of the fuel tank, a hermetically closed state of the fuel vapor purge system may be released. Thereby, pressure load applied on the fuel tank can swiftly be alleviated.

According to another aspect of the invention, a first valve is opened when leak check is finished.

For example, in the case of using a normally closed type first valve capable of maintaining a valve closing state even when electricity conduction is made OFF, even when a leak check while an engine is being stopped to operate, has been finished (main relay is made OFF), in the case in which the first valve is closed successively and the fuel vapor purge system is maintained in the hermetically closed state, there is a concern that pressure load applied on the fuel vapor purge system becomes excessively large while the engine is being stopped to operate by an increase in the pressure accompanied by generating fuel vapor or a decrease in the pressure accompanied by temperature drop. Therefore, in the case in which the hermetically closed state of the fuel vapor purge system is released by opening a canister valve when the leak check while the engine is being stopped to operate, has been finished, the pressure load applied on the fuel vapor purge system can be alleviated by returning pressure of the fuel vapor purge system to a vicinity of the atmospheric pressure when the leak check while the internal combustion engine is being stopped to operate, has been finished and a factor of causing the leak can be reduced. Further, in the case in which the canister valve is opened when the leak check while the engine is being stopped to operate, has been finished, there can be prevented beforehand a failure of fixing the canister valve to a valve closing state while the internal combustion engine is being stopped to operate.

Further, according to another aspect of the invention, when the leak check has been finished, the canister valve is temporarily opened to thereby temporarily release the hermetically closed state of the fuel vapor purge system and thereafter, the canister valve is closed again to thereby hermetically close the fuel vapor purge system.

In the case in which the hermetically closed state of the fuel vapor purge system is released by opening the canister valve when the leak check while the engine is being stopped to operate, has been finished, the pressure of the fuel vapor purge system which has been increased by generating fuel vapor in checking the leak, can swiftly be decreased to a vicinity of the atmospheric pressure after finishing the leak check. Thereafter, when the fuel vapor purge system is returned to the hermetically closed state by opening the canister valve again, by a decrease in the pressure of the fuel vapor purge system accompanied by drop of fuel temperature thereafter, the pressure of the fuel vapor purge system can be decreased to a pressure lower than the atmospheric pressure (negative pressure)in a short period of time. Thereafter, the fuel vapor purge system is maintained under negative pressure and therefore, even when a very small hole is opened assumedly in the fuel vapor purge system, only the atmosphere is sucked from the hole into the fuel vapor purge system, fuel vapor in the fuel vapor purge system can be prevented from leaking out into the atmosphere and an amount of leaking fuel vapor can be reduced.

In this case, the first valve may be closed at a time point at which pressure detected by the pressure detecting means becomes lower than a predetermined determinant. For example, the fuel vapor purge system can hermetically be closed again by closing the first valve after confirming that the pressure of the fuel vapor purge system has actually been decreased to a vicinity of the atmospheric pressure. The valve opening time of the first valve, or electricity conduction time in the case of the normally closed type first valve, can be made a necessary minimum.

Further, when the pressure detected by the pressure detecting means is equal to or smaller than a predetermined determinant, the first valve may be prevented from being opened. In the case in which the pressure of the fuel vapor purge system has already been decreased to the determinant or lower, for example, a vicinity of the atmospheric pressure when the leak check has been finished, it is not necessary to open the first valve. Thereby, when the leak check has been finished, wasteful drive to open and close the first valve can be avoided and power consumption can be reduced while the engine is being stopped to operate.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

Figure 1:
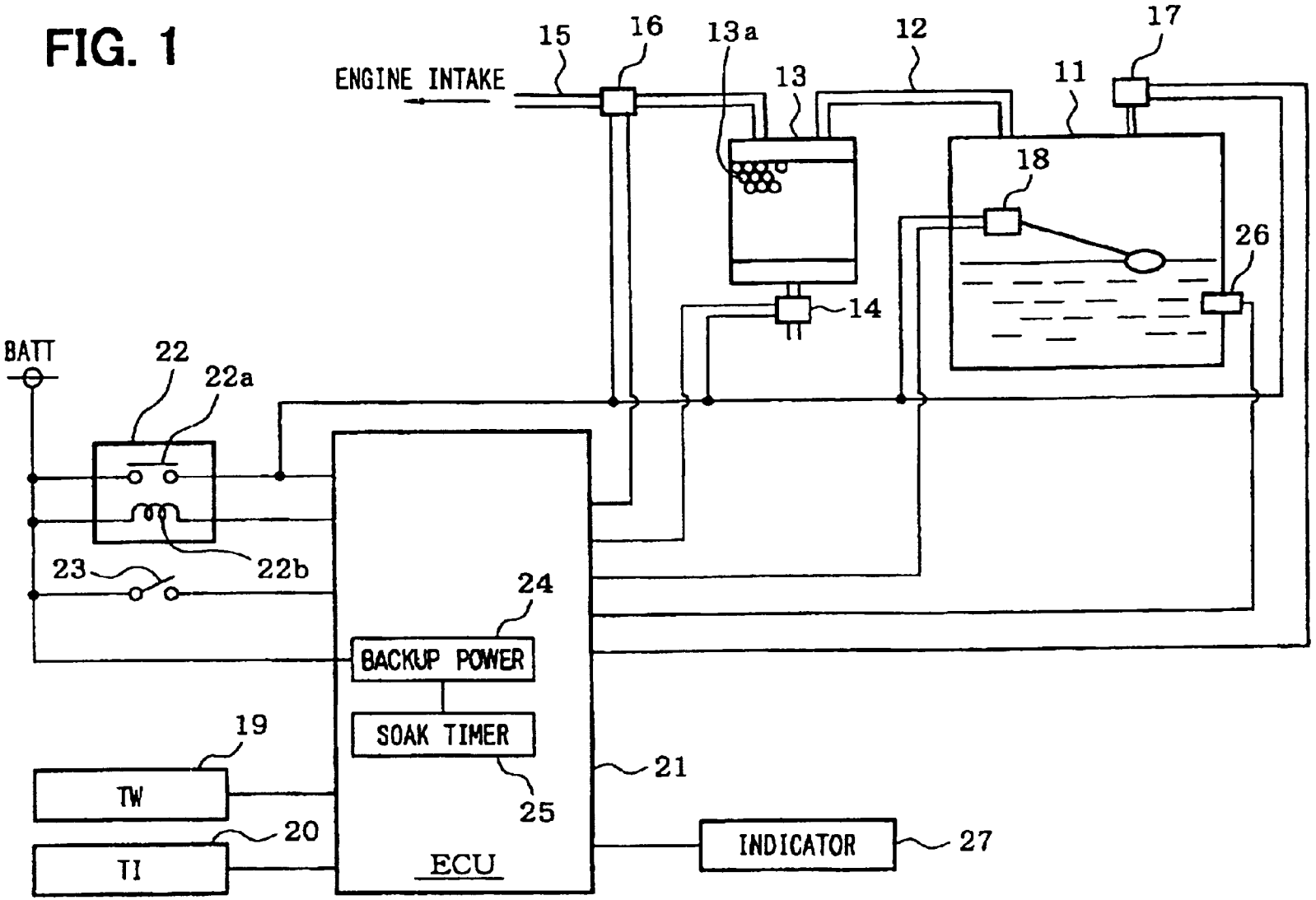
FIG. 1 is a block diagram of a fuel vapor purge system according to a first embodiment of the invention.

DETAILED DESCRIPTION OF PREFERRED EMBODIMENTS (First Embodiment)

An explanation will be given of a first embodiment of the invention in reference to FIG. 1 through FIG. 7 as follows. First, an explanation will be given of a constitution of a fuel vapor purge system in reference to FIG. 1. A fuel tank 11 is molded by resin. The fuel tank 11 is connected with a canister 13 via a fuel vapor path 12. An adsorber 13a of active carbon or the like for adsorbing the fuel vapor is contained in the canister 13. Further, an atmosphere communicating path of a bottom face portion of the canister 13 is attached with a canister valve 14 (CCV) of a power saving type, mentioned later.

Meanwhile, between the canister 13 and an engine intake system, there is provided a purge path 15 for purging (discharging) fuel vapor adsorbed to the adsorber in the canister 13 to the engine intake system and a purge valve 16 for controlling a purge flow rate is provided at a middle of the purge path 15. The purge valve 16 is constituted by a normally closed type electromagnetic valve and the purge flow rate of fuel vapor from the canister 13 to the engine intake system is controlled by controlling electricity conduction thereto by a duty control.

Further, the fuel tank 11 is provided with a pressure sensor 17 for detecting pressure thereof (pressure detecting means). When the fuel vapor purge system from inside of the fuel tank 11 to the purge valve 16 is hermetically closed, the pressure of the fuel tank 11 coincides with pressure of other portion of the fuel vapor purge system and therefore, by detecting the pressure of the fuel tank 11 (hereinafter, simply referred to as pressure) by the pressure sensor 17, pressure of the fuel vapor purge system can be detected.

The fuel tank 11 is provided with a fuel level sensor 18 for detecting a remaining amount of fuel and a fuel temperature sensor 26 for detecting fuel temperature. Other than these, there are provided various kinds of sensors of a water temperature sensor 19 for detecting engine cooling water temperature TW, an intake temperature sensor 20 for detecting intake temperature TI and the like.

Outputs of the various sensors are inputted to a control circuit 21. A power terminal of the control circuit 21 is supplied with a power voltage from a vehicle-mounted battery via a main relay 22. Other than the control circuit, the canister valve 14, the purge valve 16, the pressure sensor 17 and the fuel level sensor 18, are supplied with power voltage via the main relay 22. A relay drive coil 22b for driving a relay contact 22a of the main relay 22 is connected to a main relay control terminal of the control circuit 21, by conducting electricity to the relay drive coil 22b, the relay contact 22a is made ON and power voltage is supplied to the control circuit 21, the canister valve 14, the purge valve 16, the pressure sensor 17 and the fuel level sensor 18. Further, by making electricity conduction to the relay drive coil 22b OFF, the relay contact 22a is made OFF and power supplied to the control circuit 21 and the like is made OFF. A key SW terminal of the control circuit 21 is inputted with ON/OFF signal of an ignition switch (hereinafter, 'IG switch') 23. Further, the control circuit 21 is built with a backup power 24 and a soak timer 25 for operating to count time with the backup power 24 as power. The soak timer 25 starts operating to count time after stopping the engine (after OFF of IS switch 23) and measures elapse time after stopping the engine.

Figure 2:
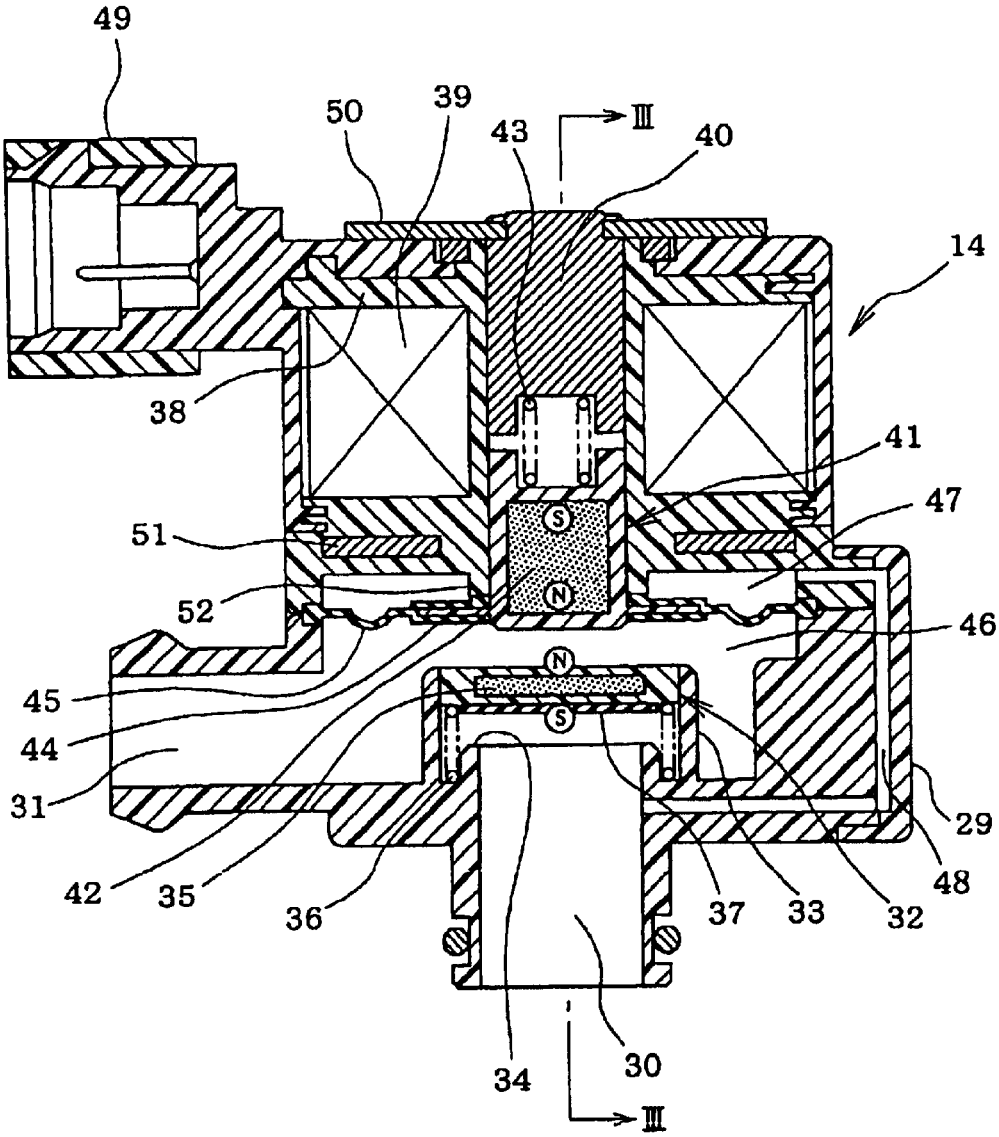
FIG. 2 is a sectional view of a canister valve according to the first embodiment of the invention.
Figure 3:
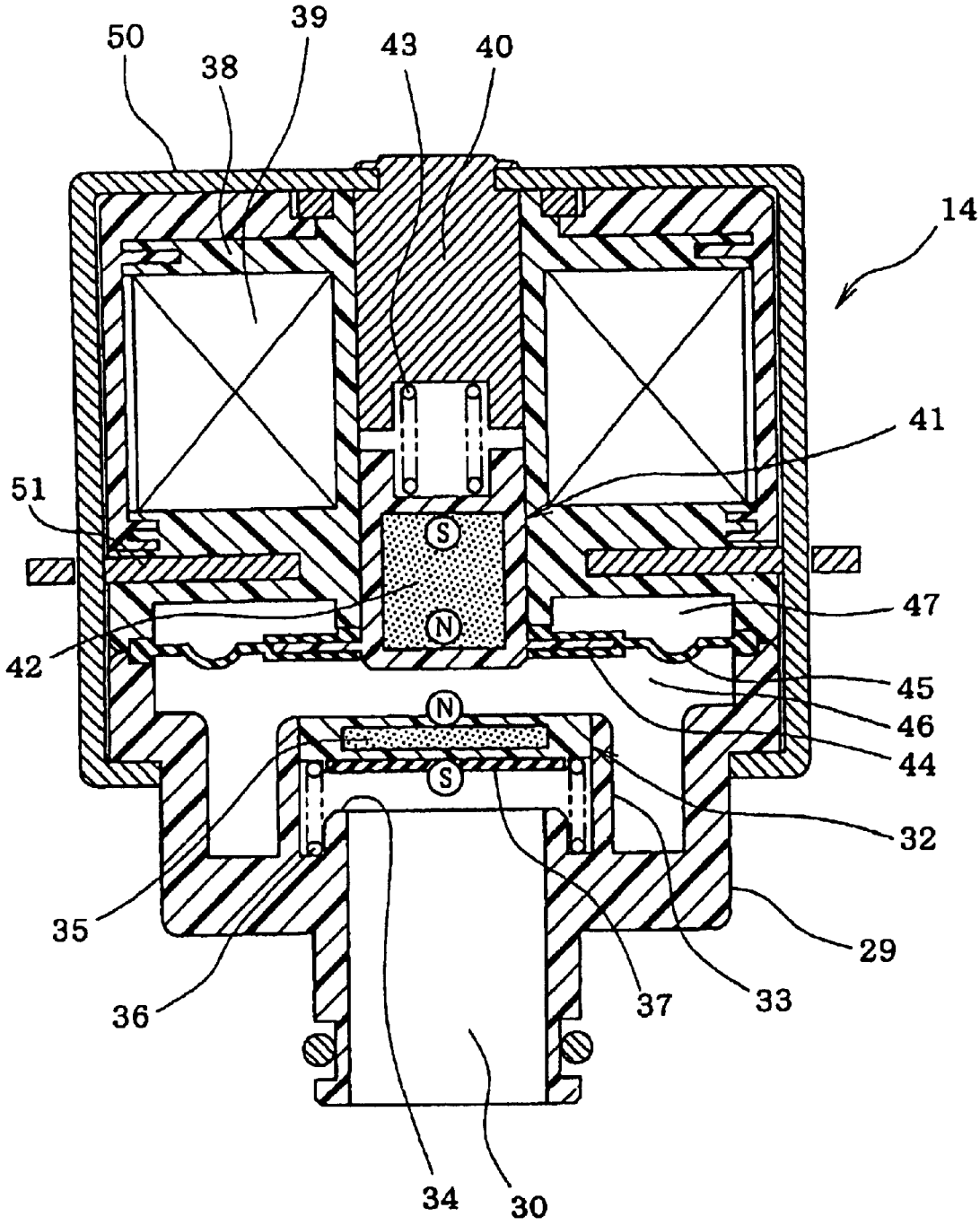
FIG. 3 is a sectional view of the canister valve according to the first embodiment of the invention.

Next, an explanation will be given of a constitution of the canister valve 14 of the power saving type in reference to FIG. 2 and FIG. 3.

A lower portion of a housing 29 of the canister valve 14, is provided with a canister port 30 connected to a side of the canister 13 and an atmosphere port 31 connected to a side of atmospheric pressure (air filter or the like). A path connecting the atmosphere port 31 and the canister port 30 is an atmosphere communicating path. An upper side of the canister port 30 is provided with a valve member 32 in a shape of a circular plate to move up and down by guiding an outer peripheral portion thereof by a plurality of pieces of guide pins 33 and the valve member 32 opens and closes a valve seat 34 formed at a peripheral edge portion of an opening of the canister port 30. The valve member 32 is formed by molding a first magnet 35 in a shape of a circular plate by resin and is urged in a valve opening direction (upper direction) by a first spring 36. A lower face of the valve member 32 is mounted with a rubber sheet 37 for promoting adherence to the valve seat 34 when the valve is closed.

Meanwhile, a solenoid coil 39 wound around a spool 38 made of resin, is contained at an upper portion of the housing 29 and a stator core 40 is fitted to an inner diameter portion of an upper side of the spool 38. Meanwhile, a moving core 41 in a shape of a circular cylinder is fitted to an inner diameter portion of a lower side of the spool 38 movably in an up and down direction. The moving core 41 is formed by molding a second magnet 42 by resin. A second spring 43 is interposed between the moving core 41 and the stator core 40 and the moving core 41 is urged downwardly by the second spring 43.

A peripheral edge portion of an inner side of a diaphragm 45 formed by an elastic member of rubber or the like, is fitted to a flange portion 44 provided at an outer periphery of a lower end portion of the moving core 41. A peripheral edge portion of an outer side of the diagram 45 is fixed to an inner peripheral portion of the housing 29. A first pressure chamber 46 on a lower side and a second pressure chamber 47 on an upper side are formed by partitioning a space in the housing 29 to upper and lower sides by the diagram 45. The canister port 30 and the atmosphere port 31 are communicated via the first pressure chamber 46 when the valve member 32 is opened. Further, the canister port 30 is communicated with the second pressure chamber 47 via a pressure introducing path 48.

Meanwhile, an upper portion of the housing 29 is provided with a connector 49 for conducting electricity to the solenoid coil 39. Further, there are provided a yoke 50 and a magnetic plate 51 constituting a magnetic circuit to surround the solenoid coil 39 and a direction of driving (upper direction/lower direction) of the moving core 41 can be switched by switching a direction of force (suction force/repulsion force) operated between the second magnet 42 of the moving core 41 and the stator core 40 by switching an electricity conducting direction of the solenoid coil 39.

An upper limit position of the moving core 41 is restricted by bringing the flange portion 44 of the moving core 41 into the contact with a stopper portion 52 to thereby prevent the moving core 41 from colliding with the stator core 40 when the moving core 41 is driven upwardly. Further, the first magnet 35 of the valve member 32 and the second magnet 42 of the moving core 41 are arranged such that same poles thereof (N poles in FIG. 1 and FIG. 2) are opposed to each other and repulsion force is operated between the two magnets 35 and 42.

Figure 4A:
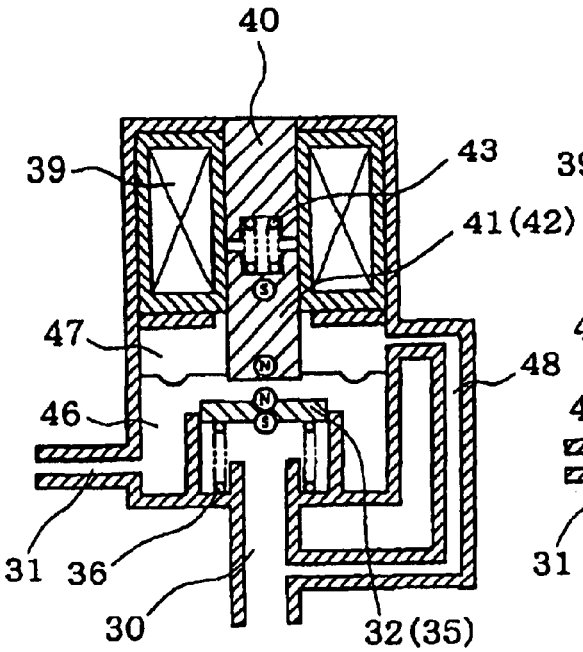
FIG. 4A is a sectional view of the canister valve according to the first embodiment of the invention.

As shown by FIG. 4A, in an initial state, the moving core 41 is held at an upper position by magnetic suction force operated between the second magnet 42 and the stator core 40 and the valve member 32 is held at an upper position by spring force of the first spring 36 and is maintained in a valve opening state.

Figure 4B:
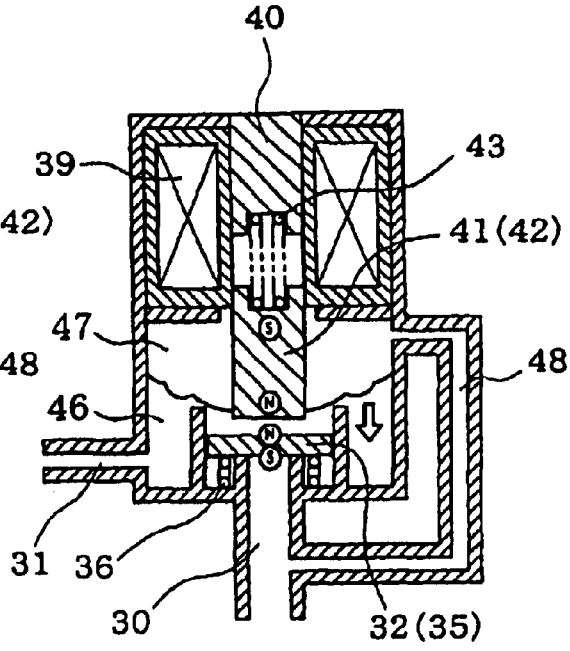
FIG. 4B is a sectional view of the canister valve according to the first embodiment of the invention.

As shown by FIG. 4B, when electricity is conducted to the solenoid coil 39 and magnetic repulsion force is operated between the second magnet 42 of the moving core 41 and the stator core 40, the moving core 41 (second magnet 42) is moved downward and the valve member 32 (first magnet 35) moves downward by magnetic repulsion force operate between the two magnets 35 and 42 to closed valve. When electricity conduction of the solenoid coil 39 is continued, regardless of whether inside of the fuel vapor purge system is under positive pressure or negative pressure (whether side of canister port 30 is under positive pressure or negative pressure), the valve member 32 can be maintained in the valve closing state.

When inside of the fuel vapor purge system becomes lower than the atmospheric pressure to constitute negative pressure under the state, the side of the canister port 30 is under negative pressure, however, the side of the first pressure chamber 46 communicating with the atmosphere port 31 is substantially under the atmospheric pressure. Thereby, force operated in the direction of closing the valve member 32 is further increased. Further, negative pressure is introduced from the canister port 30 to the second pressure chamber 47 from the pressure introducing path 48.

Figure 4C:
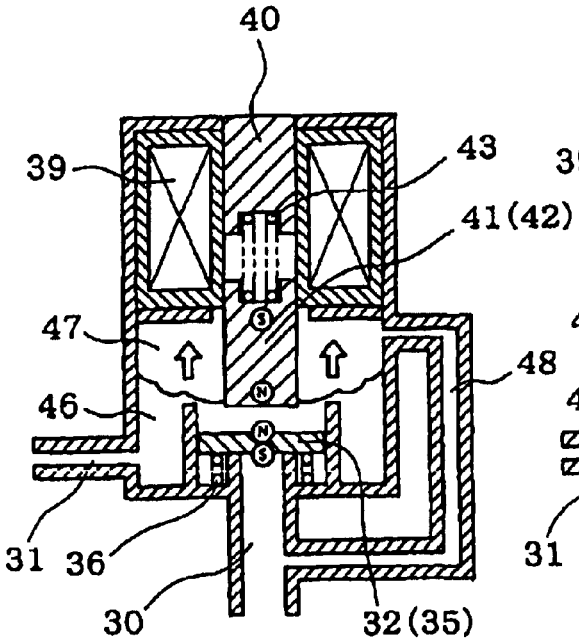
FIG. 4C is a sectional view of the canister valve according to the first embodiment of the invention.

When electricity conduction to the solenoid coil 39 is stopped thereafter, as shown by FIG. 4C, electromagnetic drive force is reduced and the moving core 41 (second magnet 42) is moved slightly upward. Thereby, the force operated in the direction of closing the valve member 32 is reduced by an amount of reducing the magnetic repulsion force operated between the two magnets 35 and 42, however, when the negative pressure at inside of the fuel vapor purge system (negative pressure on the side of canister port 30) is larger than a predetermined value, the force operated in the direction of closing the valve member 32 becomes superior and the valve member 32 is held in the valve closing state.

Figure 4D:
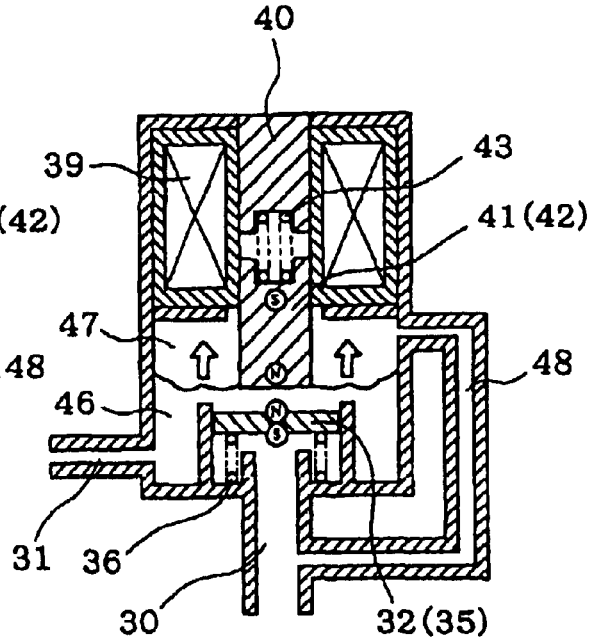
FIG. 4D is a sectional view of the canister valve according to the first embodiment of the invention.

Meanwhile, as shown by FIG. 4D, when electricity is conducted to the solenoid coil 39 in a direction reverse to that in closing the valve and suction force is operated between the moving core (second magnet 42) and the stator core 40, the moving core 41 (second magnet 42) is moved upward, the valve member 32 (first magnet 35) is released from the magnetic repulsion force operated between the two magnets 35 and 42 and there is brought about a state in which inside of the canister 13 is communicated with the atmosphere.

The control circuit 21 is mainly constituted by a microcomputer for carrying out fuel injection control, ignition control and purge control by executing fuel injection control routine, ignition control routine and purge control routine stored to ROM (storage medium) thereof. Further, the control circuit 21 closes the canister valve 14 and the purge valve 16 to thereby maintain the fuel vapor purge system in a hermetically closed state after stopping the engine (after making IG switch 23 OFF) and determines presence or absence of the leak based on the pressure (pressure of fuel vapor purge system) at this occasion by executing leak check routine shown in FIG. 5 stored to ROM. Further, the control circuit 21 determines whether the pressure is rapidly changed by deformation of the fuel tank 11 in checking the leak and stops checking the leak when it is determined that deformation of the fuel tank 11 (rapid change of pressure) is brought about in checking the leak.

Figure 6:
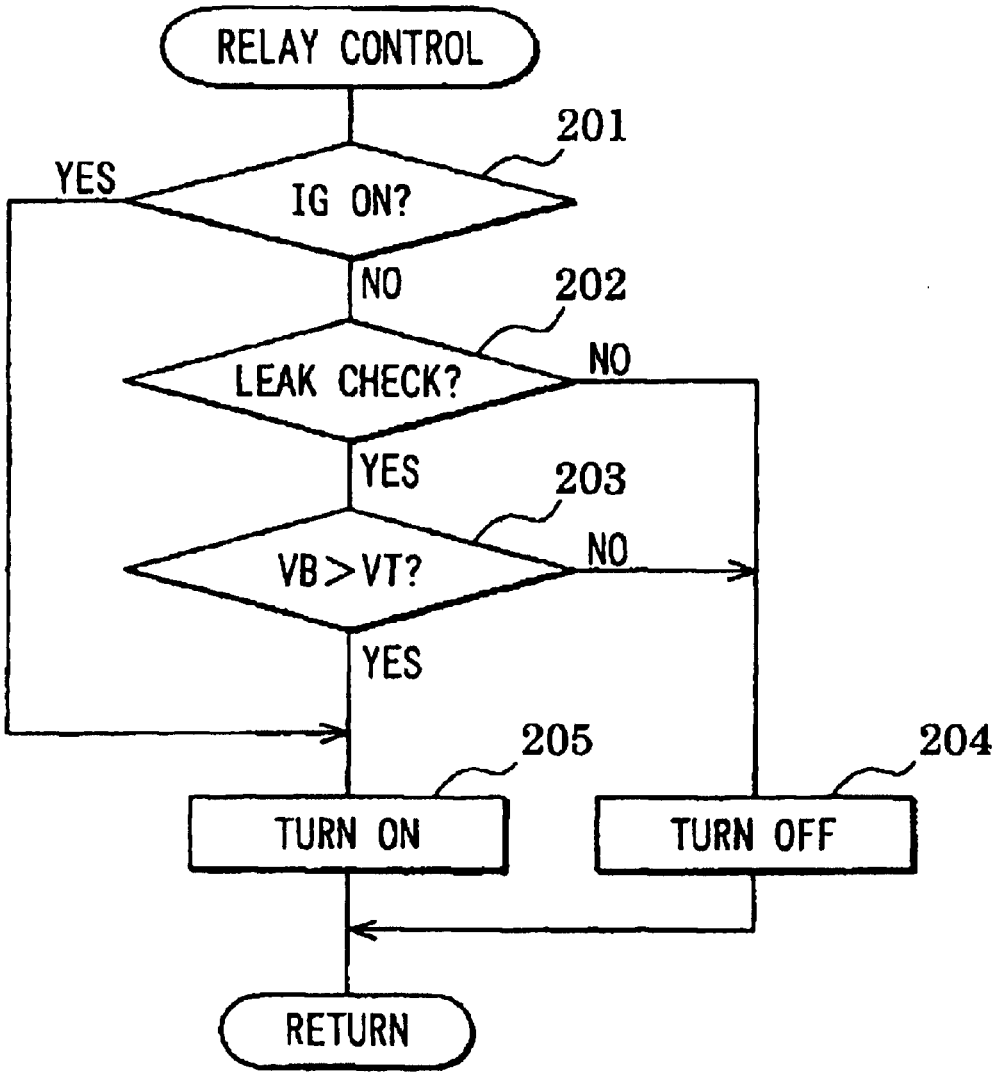
FIG. 6 is a flowchart showing relay control progressings of the fuel vapor purge system according to the first embodiment of the invention.

Further, the control circuit 21 supplies power voltage to parts necessary for carrying out the leak check (control circuit 21, canister valve 14 and the like) after stopping to operate the engine by executing the main relay control routine shown in FIG. 6 stored to ROM.

An explanation will be given here of a method of checking the leak after stopping the engine. After stopping the engine (after making IG switch 23 OFF), the purge valve 16 is immediately closed and the canister valve 14 is closed to thereby hermetically close the fuel vapor purge system. Immediately after stopping the engine, temperature of an exhaust system is high and therefore, by the heat, fuel temperature at inside of the fuel tank 11 is maintained at a temperature at which fuel vapor is liable to generate, an amount of generating the fuel vapor is increased and therefore, when the fuel vapor purge system is hermetically closed immediately after stopping the engine, in the case of absence of the leak, an amount of increasing the pressure (amount of increasing pressure of fuel vapor purge system) by generating fuel vapor is increased. Thereafter, when the fuel tank 11 is cooled by outside air and fuel vapor at inside the fuel tank 11 starts condensing (liquefying), in the case of absence of the leak, pressure of the fuel vapor purge system becomes negative pressure (equal to or lower than atmospheric pressure) in accordance with elapse of time.

Meanwhile, in the case of presence of the leak, even when the fuel vapor purge system is hermetically closed, fuel vapor is leaked from a leak hole of the fuel vapor purge system into the atmosphere, or the atmosphere is sucked from the leak hole into the fuel vapor purge system when the pressure is negative and therefore, the pressure (pressure of fuel vapor purge system) after hermetically closing the fuel vapor purge system is not increased to the positive pressure side or decreased to the negative pressure side significantly from the atmospheric pressure and the pressure is converged to a vicinity of the atmospheric pressure in a comparatively short period of time.

In consideration of such a property, during a leak check time period, when pressure Pt detected by gage pressure (atmospheric pressure reference) by the pressure sensor 17 (gage pressure=absolute pressure−atmospheric pressure), is compared with a predetermined positive pressure side determinant Pt1 and a predetermined negative pressure side determinant −Pt2, when the pressure Pt becomes higher than the positive pressure side determinant Pt1, or when the pressure Pt becomes lower than the negative pressure side determinant −Pt2, absence of leakage (normal) is determined. Meanwhile, when the pressure Pt does not become higher than the positive pressure side determinant Pt1 and the pressure Pt does not become lower than the negative pressure side determinant −Pt2 and the leak check time period is finished, presence of leak (abnormal) is determined.

Meanwhile, generally, strength of the fuel tank 11 made of resin is lower than that of a conventional fuel tank made of a metal and therefore, in checking the leak by bringing the fuel vapor purge system into the hermetically close state, when a pressure difference between the pressure and atmospheric pressure (outside air pressure) becomes successively large, at a time point at which the pressure difference exceeds a certain limit pressure, there is brought about a phenomenon of deforming to bulge a wall face of the fuel tank 11 to an outer side by increasing the pressure or deforming the wall face of the fuel tank 11 to recess to an inner side when negative pressure is increased. When such a deformation of the fuel tank 11 is brought about in checking the leak, the volume of the fuel tank 11 is rapidly changed and the pressure is rapidly changed and therefore, there is a concern of erroneously determining presence or absence of the leak by being influence by the pressure change.

Hence, according to the first embodiment, it is determined whether the fuel tank 11 is deformed, by whether the pressure is rapidly changed in checking the leak and when the fuel tank 11 is deformed (pressure is rapidly changed), leak check is canceled and presence or absence of the leak is prevented from being erroneously determined by being tank 11.

Figure 5:
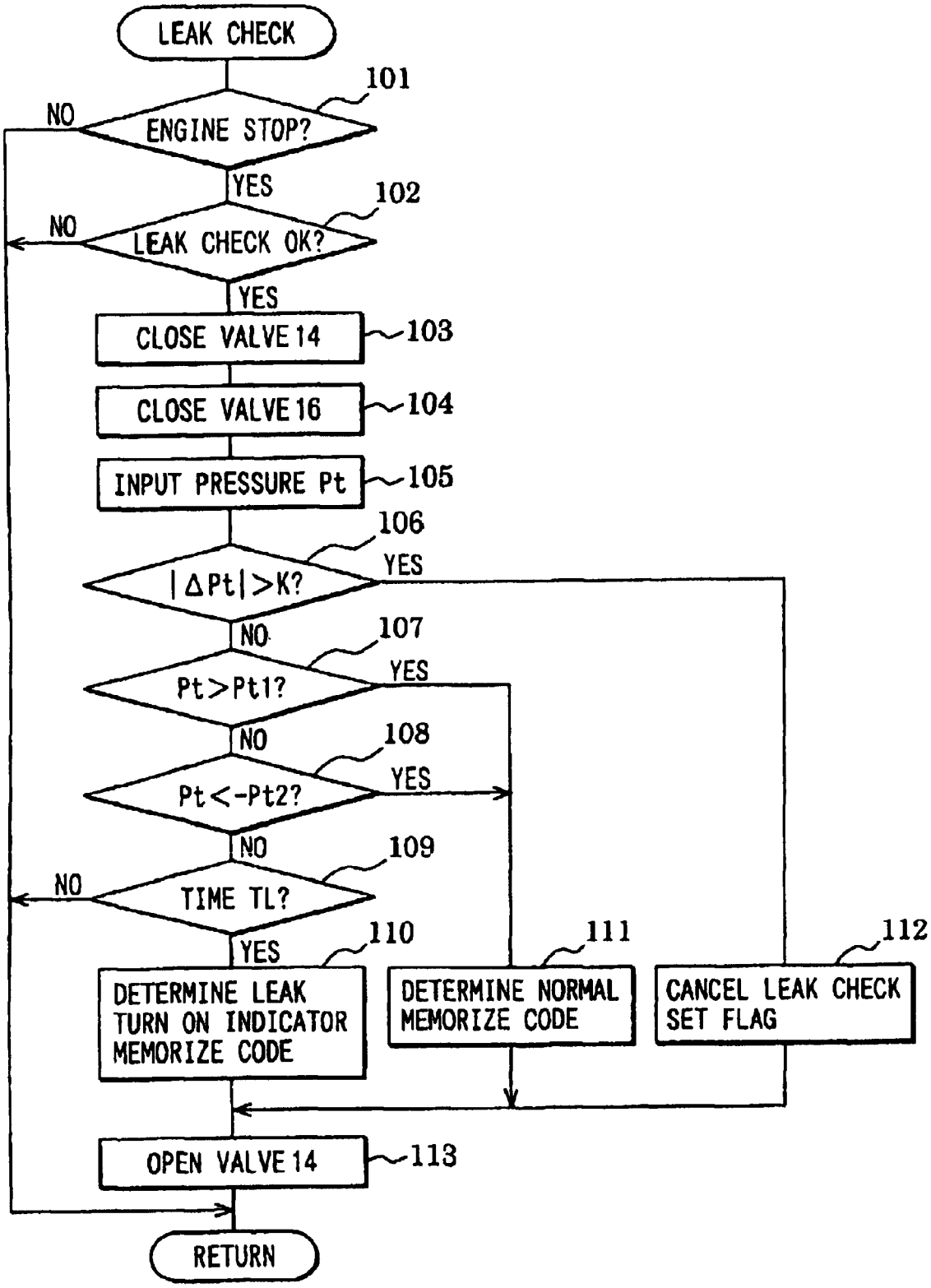
FIG. 5 is a flowchart showing leak check processings of the fuel vapor purge system according to the first embodiment of the invention.

The leak check of the fuel vapor purge system explained above is carried out as follows by a leak check routine of FIG. 5. The leak check routine of FIG. 5 is periodically executed when power is being supplied to the control circuit 21 (when main relay 22 is made ON). When the routine is started, first, at step 101, it is determined whether the engine has been stopped (after making IG switch 23 OFF) and when the engine is being operated, the routine is finished without carrying out processings thereafter.

Meanwhile, when it is determined that the engine has been stopped (after making IG switch 23 OFF) at the step 101, the operation proceeds to next step 102 and determines whether a leak check executing condition is established. The leak check executing condition is that, for example, fuel temperature detected by the fuel temperature sensor 26 is equal to or higher than the predetermined temperature at which fuel vapor is liable to generate and when the fuel temperature is equal to or higher than the predetermined temperature, the leak check executing condition is established.

Further, in determining the leak check executing condition, in place of the fuel temperature, there may be used a parameter correlated to the fuel temperature, for example, running history before stopping the engine (running time, running distance) or an engine operating state (cooling water temperature or the like). For example, the leak check executing condition may be established when the running time is equal to or longer than predetermined time or when the running distance is equal to or larger than a predetermined value.

When it is determined in the step 102 that the fuel temperature is less than predetermined temperature and the leak check executing condition is not established, the routine is finished without executing processings thereafter. Meanwhile, when the fuel temperature is equal to or higher than the predetermined temperature and it is determined that the leak check executing condition is established, leak check processings at and after step 103 are executed as follows. First, at step 103, the canister valve 14 is closed and at next step 104, the purge valve 16 is closed to thereby hermetically close the fuel vapor purge system.

Thereafter, the operation proceeds to step 105 and detects the pressure Pt at current time by reading an output signal of the pressure sensor 17. At this occasion, as the pressure Pt, there is used the gage pressure (gage pressure=absolute pressure−atmospheric pressure) detected with the atmospheric pressure as a reference. Thereafter, the operation proceeds to step 106 and determines whether the pressure Pt is rapidly changed (whether fuel tank 11 is deformed) by whether the absolute value of a pressure change amount ΔPt per operation period (per predetermined time) is larger than a predetermined determinant K.

When it is determined negatively (when it is determined that pressure Pt is not rapidly changed) at step 106, it is determined at step 107 whether the pressure Pt is higher than the predetermined positive pressure side determinant Pt1 and it is determined at next step 108 whether the pressure Pt is lower than the predetermined negative pressure side determinant −Pt2. Although the determinants Pt1 and −Pt2 may be constituted by fixed values for simplifying the operation, the determinants may be changed by maps or the like in accordance with a remaining amount of fuel in the fuel tank 11 and/or fuel temperature.

When it is determined affirmatively (when it is determined that pressure Pt is higher than positive pressure side determinant Pt1) at step 107, or when it is determined affirmatively (when it is determined that pressure Pt is lower than negative pressure side determinant −Pt2) at step 108, the operation proceeds to step 111, absence of leak (normal) is determined, a normal code is stored to backup RAM (not illustrated) of the control circuit 21, thereafter, the operation proceeds to step 113, opens the canister valve 14 to thereby release the hermetically closed state of the fuel vapor purge system and finish the leak check.

In contrast thereto, when it is determined negatively (that is, when pressure Pt falls in ranges of positive pressure side determinant Pt1 and negative pressure side determinant −Pt2) both at step 107 and step 108, the operation proceeds to step 109 and determines whether elapse time after starting the leak check exceeds predetermined time by whether measured time of the soak timer 25 (elapse time after stopping engine) exceeds predetermined time and when the elapse time after starting the leak check dose not exceed the predetermined time, the routine is finished as it is.

Thereafter, when it is not determined affirmatively at the step 107 or step 108 and it is determined at step 109 that the elapse time after starting the leak check exceeds the predetermined time (that is, state in which pressure Pt falls in ranges of positive pressure side determinant Pt1 and negative pressure side determinant −Pt2, continues for predetermined time or longer), the operation proceeds to step 110, determines presence of the leak (abnormal), alarms a driver by turning on an indicator 27, stores an abnormality code to backup RAM of the control circuit 21 and thereafter, proceeds to step 113 and releases a hermetically closed state of the fuel vapor purge system by opening the canister valve 14 to thereby finish the leak check. Processings of the steps 103 through 111 and 113 serve as leak checking means in the scope of claims.

Meanwhile, when it is determined affirmatively at the step 106 in checking the leak, it is determined that the pressure Pt is rapidly changed by deformation of the fuel tank 11, the operation proceeds to step 112, cancels the leak check and sets a fuel tank deformation flag, thereafter, proceeds to step 113, opens the canister valve 14 to thereby release the hermetically closed state of the fuel vapor purge system. Processings of the steps 112 and 113 serve as leak check canceling means in the scope of claims.

Meanwhile, a main relay control routine of FIG. 6 is executed at each predetermined time for controlling ON/OFF of the main relay 22 as follows. When the routine is started, first, at step 201, it is determined whether the IG switch 23 is made ON, that is, whether the engine is being operated, when the IG switch 23 is brought into an ON state (engine is being operated), the operation proceeds to step 205, maintains the main relay 22 in an ON state and supplies power voltage to the control circuit 21, the canister valve 14, the purge valve 16, the pressure sensor 17 and the like.

Thereafter, at a time point at which the IG switch 23 is switched from ON to OFF, it is determined negatively at step 201, the operation proceeds to step 202, determines whether the leak check is being executed by the leak check routine of FIG. 5, when the leak check is not executed, the operation proceeds to step 204, makes the main relay 22 OFF and cuts power supplied to the control circuit 21, the canister valve 14, the purge valve 16, the pressure sensor 17 and the like.

In contrast thereto, when it is determined at the step 202 that the leak check is being checked, the operation proceeds to step 203 and determines whether the power voltage VB is higher than predetermined voltage VT capable of ensuring starting performance of the engine and when the power voltage is equal to or lower than the predetermined voltage, the operation proceeds to step 204, makes the main relay 22 OFF even in the midst of the leak check and cancels the leak check by cutting power supplied to the control circuit 21, the canister valve 14 and the like to thereby prevent dissipation of the battery.

Meanwhile, when the power voltage VB is higher than the predetermined voltage VT, the operation proceeds to step 205, maintains the main relay 22 in the ON state even after making the IG switch 23 OFF (after stopping engine) and the continues power supplied to parts necessary for continuing the leak check (control circuit 21, canister valve 14 and the like). Further, at the time point at which the leak check has been finished, it is determined negatively at step 202, the operation proceeds to step 204 and makes the main relay 22 OFF to thereby cut power supplied to the control circuit 21, the canister valve 14 and the like.

An explanation will be given of an example of executing the leak check of the first embodiment explained above in reference to a time chart of FIG. 7. At a time point t0 at which the IG switch 23 is made OFF (engine is stopped) and the leak check executing condition is established, the canister valve 14 is closed and the purge valve 16 is closed to thereby hermetically close the fuel vapor purge system and start the leak check. During the leak check, presence or absence of the leak is determined by comparing the pressure Pt with the positive pressure side determinant Pt1 and the negative pressure side determinant Pt2.

During the leak check, when the fuel tank 11 is deformed by a difference between pressures at inside and outside of the fuel tank 11 at, for example, time point t1, the volume of the fuel tank 11 is rapidly changed and the pressure is rapidly changed. As shown by a comparative example shown in FIG. 7 by a broken line, when the leak check is continued up to a time point t3, there is a possibility of erroneously determining presence or absence of the leak by being influenced by the pressure change by the deformation of the fuel tank 11.

Figure 7:
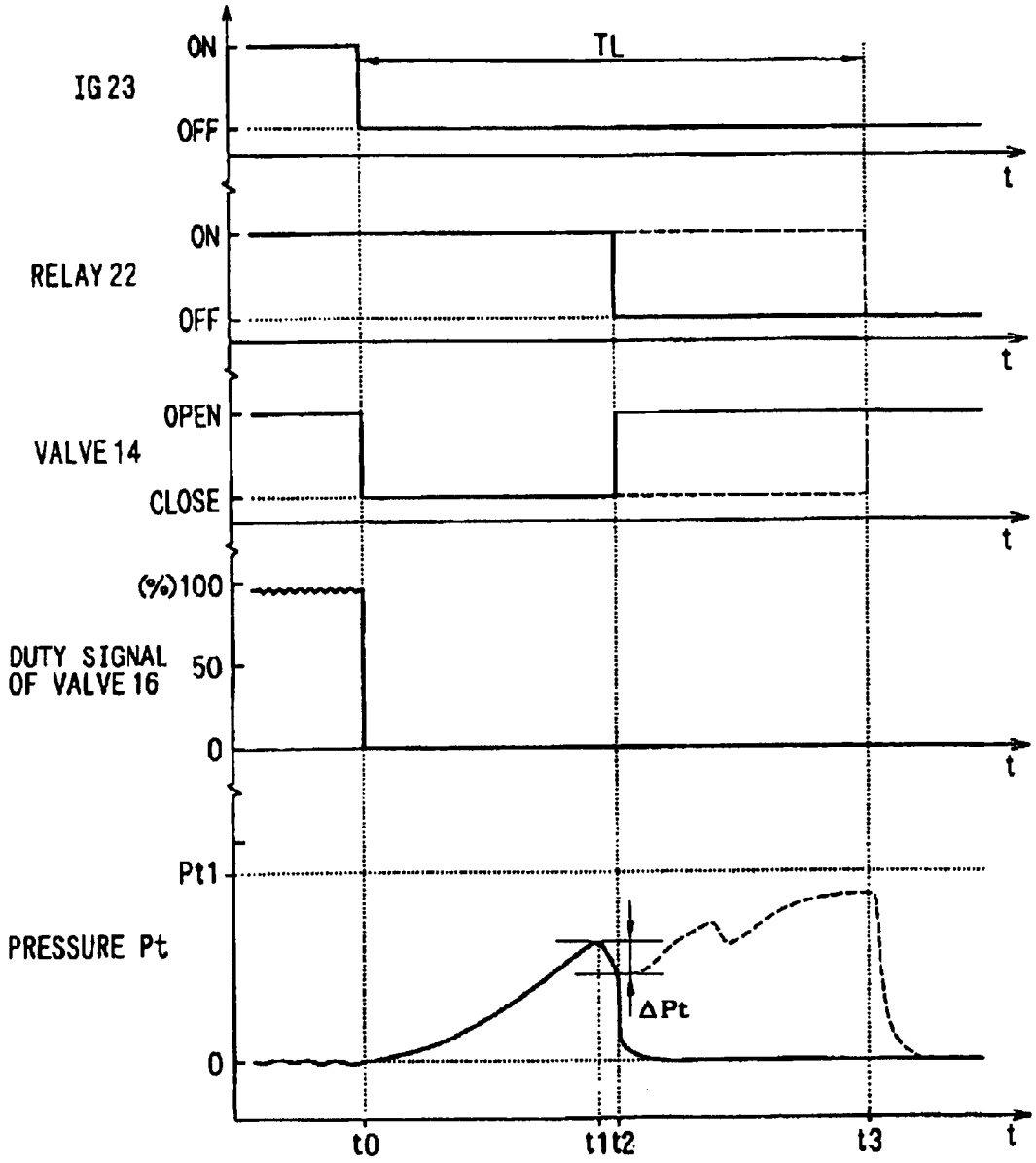
FIG. 7 is a time chart showing a leak check procedure according to the first embodiment of the invention.
Figure 8:
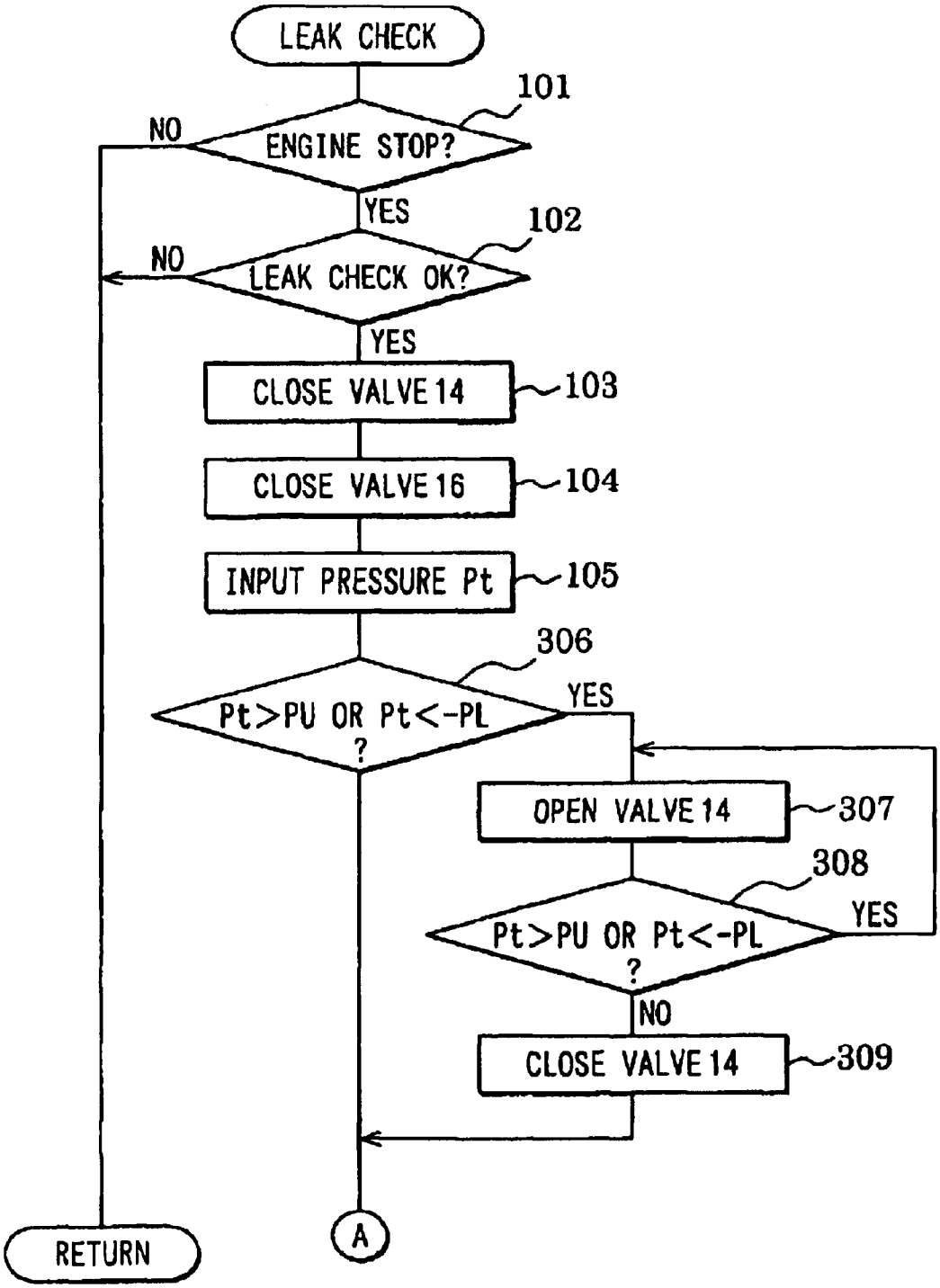
FIG. 8 is a flowchart showing leak check processings of a fuel vapor purge system according to a second embodiment of the invention.

In contrast thereto, according to the first embodiment shown in FIG. 7 by a bold line, when the fuel tank 11 is deformed, the leak check is cancelled. In FIG. 7, the leak check is cancelled at a time point t2. Thereby, it can be prevented beforehand to erroneously determine presence or absence of the leak by being influenced by the pressure change by deformation of the fuel tank 11 and reliability of leak check can be promoted.

Further, according to the first embodiment, in canceling the leak check by detecting deformation of the fuel tank 11 (rapid change of pressure), the canister valve 14 is opened to thereby release the hermetically closed state of the fuel vapor purge system and therefore, when deformation of the fuel tank 11 is brought about, by immediately releasing the hermetically closed state of the fuel vapor purge system and making the pressure in the fuel vapor purge system approach swiftly to the atmospheric pressure, pressure load applied on the fuel tank 11 can swiftly be alleviated.

(Second Embodiment)

Next, an explanation will be given of a second embodiment of the invention in reference to FIG. 8 to FIG. 12. Elements the same as or similar to those in the first embodiment are attached with the same notations and an explanation thereof will not be repeated. According to the second embodiment, by executing a leak check routine shown in FIG. 8 and FIG. 9, during leak check after stopping the engine (after making IG switch 23 OFF) the pressure Pt is restricted by a predetermined positive pressure side restricted value PU and predetermined negative pressure side restricted value −PL and when the pressure Pt is rapidly changed (when deformation of fuel tank is brought about) in leak check, leak check is cancelled and the positive side restricted value PU or the negative pressure restricted value −PL is corrected in a direction of approaching the atmospheric pressure.

At step 306, it is determined whether the pressure Pt is higher than the predetermined positive pressure side restricted value PU or whether the pressure Pt is lower than the predetermined negative pressure side restricted value −PL.

At the step 306, when it is determined that the pressure Pt is higher than the positive pressure side restricted value PU or it is determined that the pressure Pt is lower than the negative pressure side restricted value −PL, the operation proceeds to step 307, the canister valve 14 is opened to bring the pressure Pt to fall in the restricted range (PU≧Pt≧−PL), thereafter, the operation proceeds to step 308 and it is determined again whether the pressure Pt is higher than the positive side restricted value PU or whether the pressure Pt is lower than the negative pressure side restricted value −PL. During a time period in which it is affirmatively determined at the step 308, the canister valve 14 is maintained in a valve opening state. Thereafter, at step 308, the operation proceeds to 309 at a time point at which the pressure Pt falls in the restricted range (PU≧Pt≧−PL), the canister valve 14 is closed and thereafter, the operation proceeds to step 106 of FIG. 9. The above-described processings of steps 306 through 309 serve as restricting means.

Figure 9:
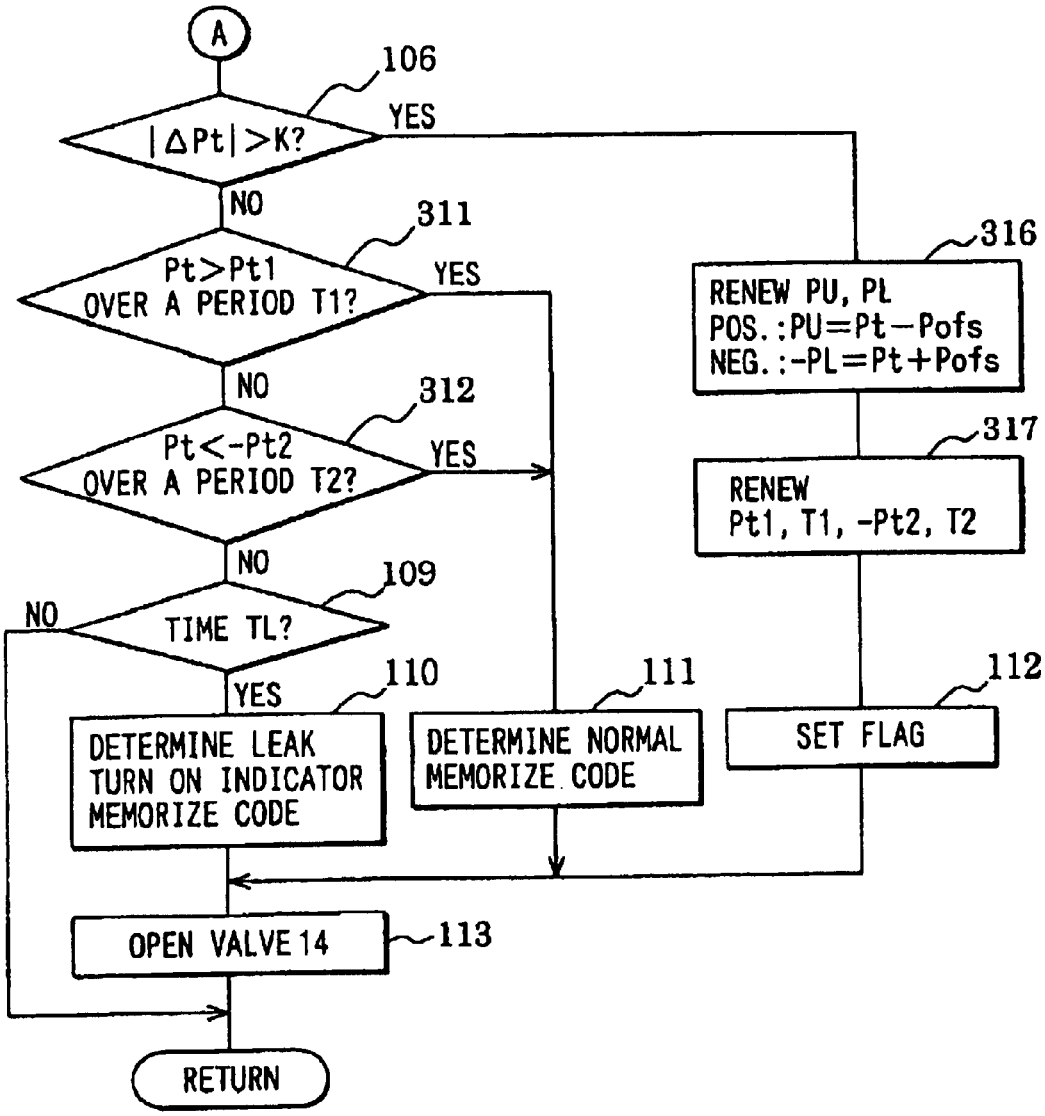
FIG. 9 is a flowchart showing leak check processings of the fuel vapor purge system according to the second embodiment of the invention.

Meanwhile, when it is determined at the step 306 that the pressure Pt falls in the restricted range (PU≧Pt≧−PL), the operation proceeds to step 106 of FIG. 9 while closing the canister valve 14.

When it is negatively determined (when it is determined that pressure Pt is not rapidly changed) at step 106, it is determined at step 311 whether a state in which the pressure Pt is higher than the positive pressure side determinant Pt1, continues over a positive pressure side determinant time period T1, further, at next step 312, it is determined whether a state in which the pressure Pt is lower than the negative pressure side determinant −Pt2, continues over a negative pressure side determining time period T2.

When it is determined affirmatively (when it is determined that the state in which pressure Pt is higher than positive pressure side determinant Pt1, continues over positive pressure side determinant time period T1) at step 311, or when it is determined affirmatively (when it is determined that the state in which pressure Pt is lower than negative pressure side determinant −Pt2, continues over negative pressure side determinant time period T2) at step 312, the operation proceeds to step 111.

In contrast thereto, when it is determined negatively both at step 311 and step 312, the operation proceeds to step 109.

Meanwhile, when it is determined affirmatively at the step 106 during leak check, it is determined that deformation of the fuel tank 11 (rapid change of pressure Pt) is brought about even when the pressure Pt is restricted by the positive pressure side restricted value PU and the negative pressure restricted value −PL, the operation proceeds to step 316 and the positive pressure side restricted value PU or the negative pressure side restricted value −PL is corrected in a direction of approaching the atmospheric pressure as follows. In the case in which deformation of the fuel tank 11 is brought about when the pressure Pt is positive pressure, the positive pressure side restricted value PU is corrected to a value of the current pressure Pt subtracted by a predetermined value Pofs (PU=Pt−Pofs). Meanwhile, in the case in which deformation of the fuel tank 11 is brought about when the pressure Pt is negative pressure, the negative pressure side restricted value −PL is corrected to a value of the current pressure Pt added with the predetermined value Pofs (−PL=Pt+Pofs). Thereby, the positive side restricted value PU or the negative pressure side restricted value −PL is corrected to pressure lower than pressure when deformation of the fuel tank 11 is actually brought about (pressure on side of atmospheric pressure). The corrected positive pressure side restricted value PU or the corrected negative pressure side restricted value −PL is used in leak check after stopping the engine at next time.

Figure 10A:
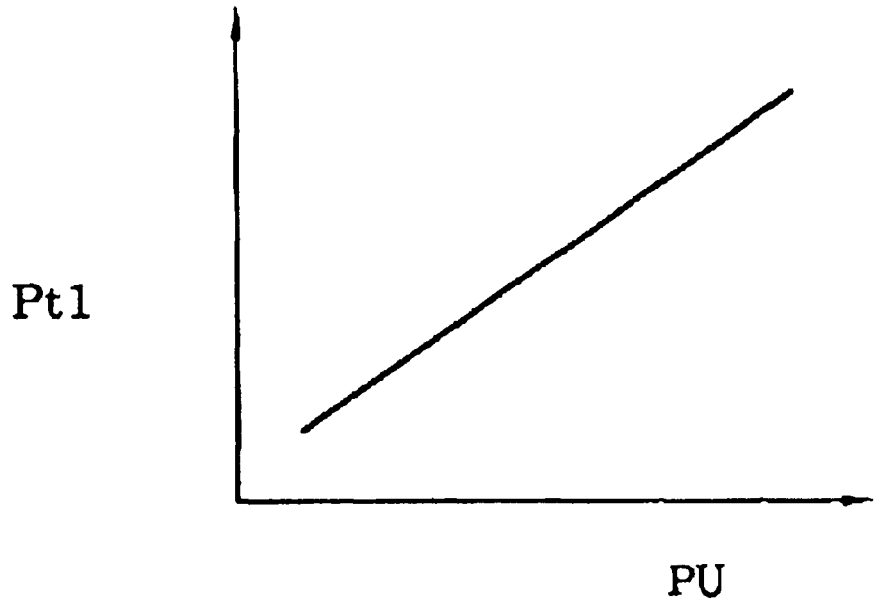
FIG. 10A is a graph showing a correction characteristic according to the second embodiment of the invention.
Figure 10B:
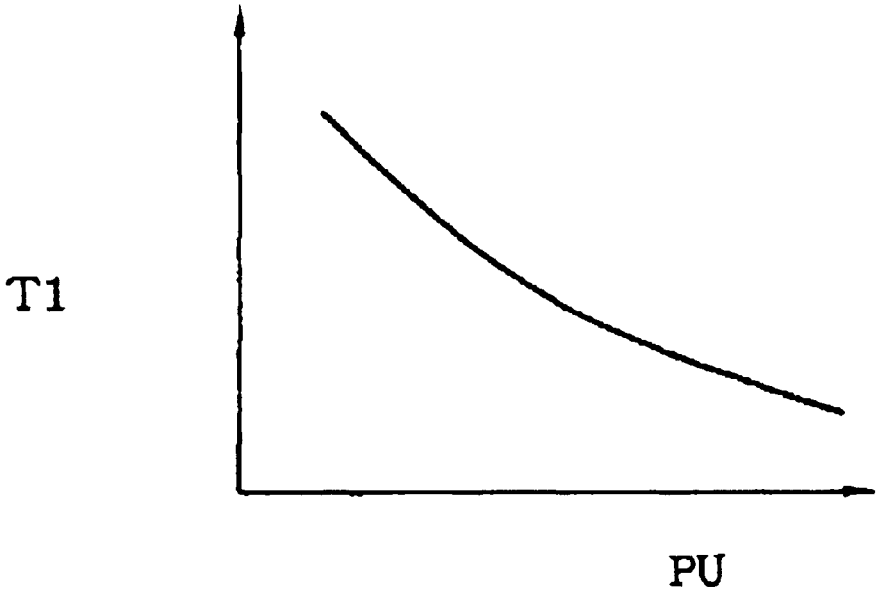
FIG. 10B is a graph showing a correction characteristic according to the second embodiment of the invention.
Figure 11A:
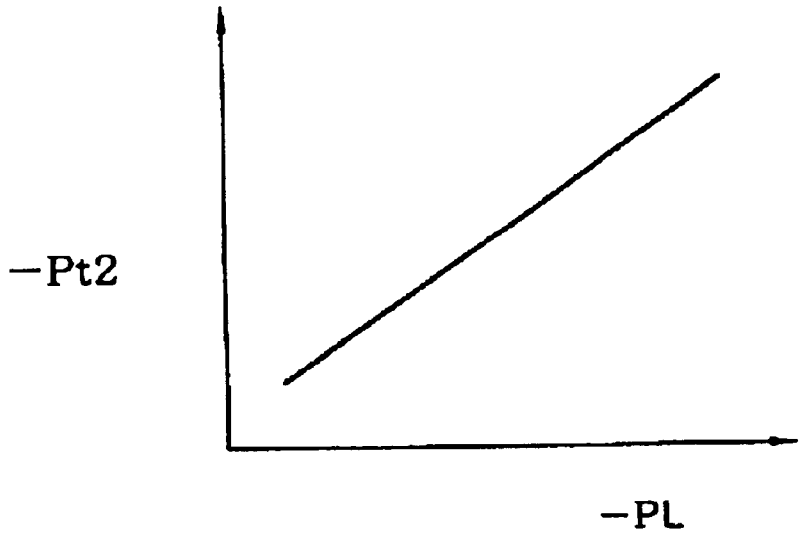
FIG. 11A is a graph showing a correction characteristic according to the second embodiment of the invention.
Figure 11B:
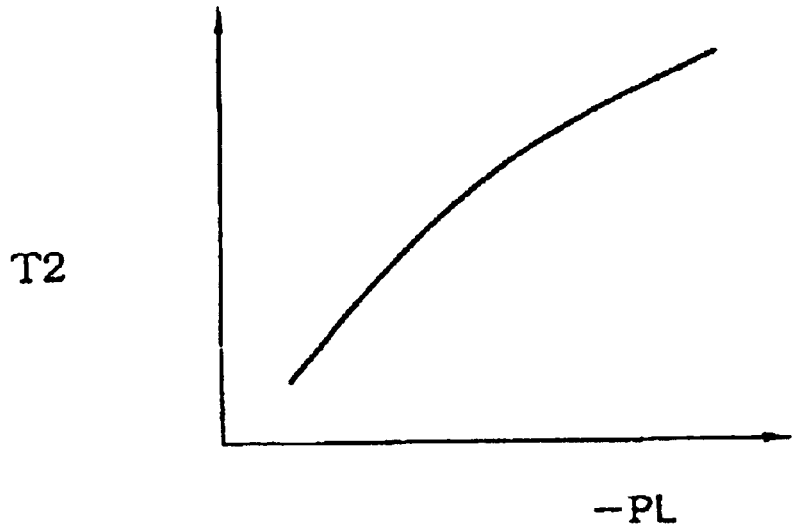
FIG. 11B is a graph showing a correction characteristic according to the second embodiment of the invention.

Thereafter, the operation proceeds to step 317, in the case in which deformation of the fuel tank 11 is brought about when the pressure Pt is positive pressure, the positive pressure side determinant Pt1 is corrected in accordance with the corrected positive pressure side restricted value PU by a map shown in FIG. 10A or by an equation and the positive pressure side determining time period T1 is corrected in accordance with the corrected positive pressure side restricted value PU by a map shown in FIG. 10B or by an equation. Thereby, when the positive pressure side restricted value PU is corrected in the direction of the atmospheric pressure, the positive pressure side determinant Pt1 is reduced and the positive pressure side determining time period T1 is prolonged. Further, in the case in which deformation of the fuel tank 11 is brought about when the . pressure Pt is negative pressure, the negative pressure side determinant −Pt2 is corrected in accordance with the corrected negative pressure side restricted value −PL by a map shown in FIG. 11A or by an equation and the negative pressure side determining time period T2 is corrected in accordance with the corrected negative pressure side restricted value −PL by a map shown in FIG. 11B or by an equation. Thereby, when the negative pressure side restricted value −PL is corrected in the direction of the atmospheric pressure, the negative pressure side determinant −Pt2 is increased and the negative pressure side determinant time period T2 is prolonged. The corrected positive pressure side determinant Pt1 and the corrected positive pressure side determinant time period T1 or the corrected negative pressure side determinant −Pt2 and the corrected negative pressure side determinant time period T2, are used in leak check after stopping the engine at next time.

Thereafter, the operation proceeds to step 112.

Figure 12:
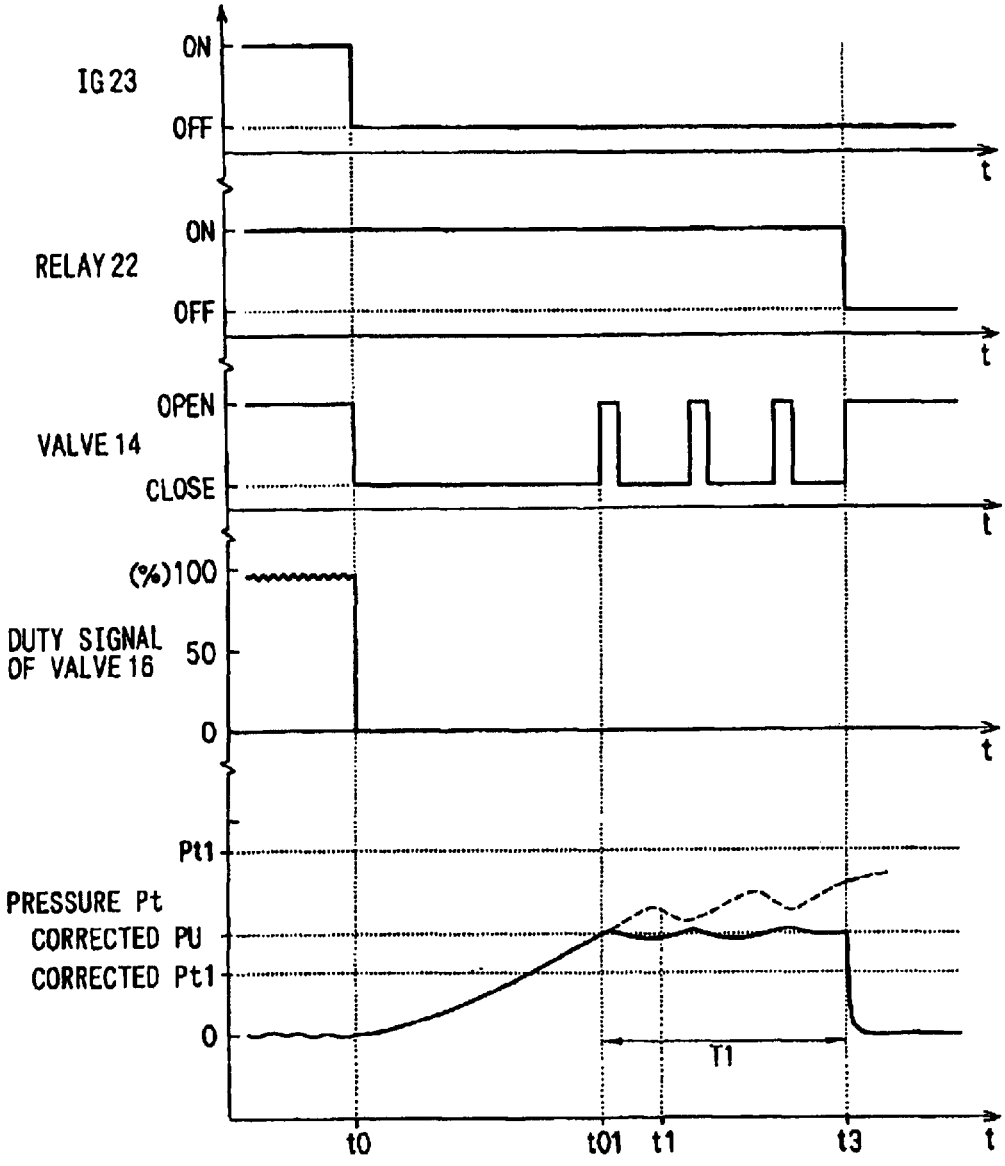
FIG. 12 is a time chart showing a leak check procedure according to the second embodiment of the invention.

According to the second embodiment explained above, in the case in which deformation of the fuel tank 11 (rapid change of pressure Pt) is brought about even when the pressure Pt is restricted by the positive pressure side restricted value PU and the negative pressure side restricted value −PL, the positive pressure side restricted value PU or the negative pressure side restricted value −PL is corrected in the direction of approaching the atmospheric pressure. FIG. 12 is a graph showing an example of control by the second embodiment. Under restricted values and determinants by initial setting, the pressure Pt is increased as shown by a broken line. For example, at time t1, deformation of the fuel tank is brought about. According to the second embodiment, the restricted values and the determinants are corrected. The corrected restricted values and the corrected determinants are used in leak check at next time. A bold line of FIG. 12 indicates a change of pressure by leak check after correction. The pressure Pt is restricted at and after time t01. As a result, leak check can be executed without bringing about deformation of the fuel tank. Leak check is finished at, for example, time t3. In FIG. 12, there is shown determining time t1 at step 311. As shown by the time chart of FIG. 12, the pressure Pt can firmly be restricted in a pressure range by which deformation of the fuel tank 11 is not brought about by the corrected positive pressure side restricted value PU or the corrected negative pressure side restricted value −PL. Deformation of the fuel tank 11 can firmly be prevented and leak check can be completed to the end.

Further, the positive pressure side restricted value PU and the negative pressure side restricted value −PL may be set in accordance with a parameter correlated to temperature at inside of the fuel tank 11 or a periphery thereof (for example, fuel temperature detected by fuel temperature sensor 26). Thereby, the pressure Pt can be restricted to the pressure range by which deformation of the fuel tank 11 is not brought about by changing the positive pressure side restricted value PU or the negative pressure side restricted value −PL in correspondence with a fuel vapor generating amount (pressure rise amount of fuel vapor purge system) or a change in the strength characteristic of the fuel tank 11 in accordance with temperature at inside of the fuel tank 11 or a periphery thereof. In this case, the fuel temperature sensor 26 serves to correspond to temperature determining means in the scope of claims. Further, instead of fuel temperature, as a parameter correlated to temperature at inside of the fuel tank 11 or a periphery thereof, for example, there may be used running history (running time, running distance) before stopping the engine or an engine operating state (cooling water temperature or the like).

Although according to the respective first and second embodiments explained above, when the leak check is cancelled by detecting deformation of the fuel tank 11 (rapid change of pressure), the canister valve 14 is opened to thereby release the hermetically closed state of the fuel vapor purge system, the purge valve 16 may be opened instead of the canister valve 14. When engine is stopped, inside of an intake pipe is filled with the atmosphere and therefore, when the purge valve 16 is opened, the atmosphere at inside of the intake pipe is introduced into the fuel tank 11 via the purge valve 16 and the pressure becomes the atmospheric pressure. Or when leak check is cancelled, both of the canister valve 14 and the purge valve 16 may be opened.

Further, although according to the above-described respective first and second embodiments, the invention is applied to the fuel vapor purge system having the fuel tank made of resin when the engine is being stopped, the invention may be applied to leak check of the fuel vapor purge system operated.

Further, the method of leak check may pertinently be modified.

For example, presence of absence of leak may be determined by comparing a summed pressure value calculated by summing the pressure by a predetermined operation period during the leak check time period with a leak determinant.

Or, presence or absence of leak may be determined by detecting a maximum value (or minimum value) of the pressure during the leak check time period and comparing the maximum value (or minimum value) of the pressure with a leak determinant.

Or, presence or absence of leak may be determined by comparing the pressure detected after elapse of a predetermined time period from starting to check the leak (hermetically closing fuel vapor purge system) with a leak determinant.

Or, presence or absence of leak may be determined by monitoring a change in the pressure after starting to check the leak and measuring a time period until a rate of increasing the pressure becomes equal to or smaller than a predetermined value (for example, substantially null) and by whether the time period is shorter than a leak determinant.

Or, presence or absence of leak may be determined by whether the pressure becomes equal to or lower than predetermined pressure (for example, vicinity of atmospheric starting to check the leak.

Meanwhile, although according to the above-described respective first and second embodiments, there is used the canister valve 14 of the power saving type capable of maintaining the valve closing state by utilizing negative pressure of the intake pipe in operating the engine, the canister valve may be constituted by an electromagnetic valve of a power saving type conducting electricity only in switching to open valve/close valve and maintaining the valve opening state/valve closing state continuously even after cutting electricity conduction by a permanent magnet or the like. In this case, when electricity is conducted to the canister valve to close in starting to check the leak after stopping the engine, the fuel vapor purge system can be maintained in the hermetically closed state by maintaining the canister valve in the valve closing state even when electricity is not conducted thereafter and therefore, it is not necessary to a conduct electricity to the canister valve during the time period of checking the leak and a power consumption amount during the time period of checking the leak can be reduced by that amount.

Figure 13:
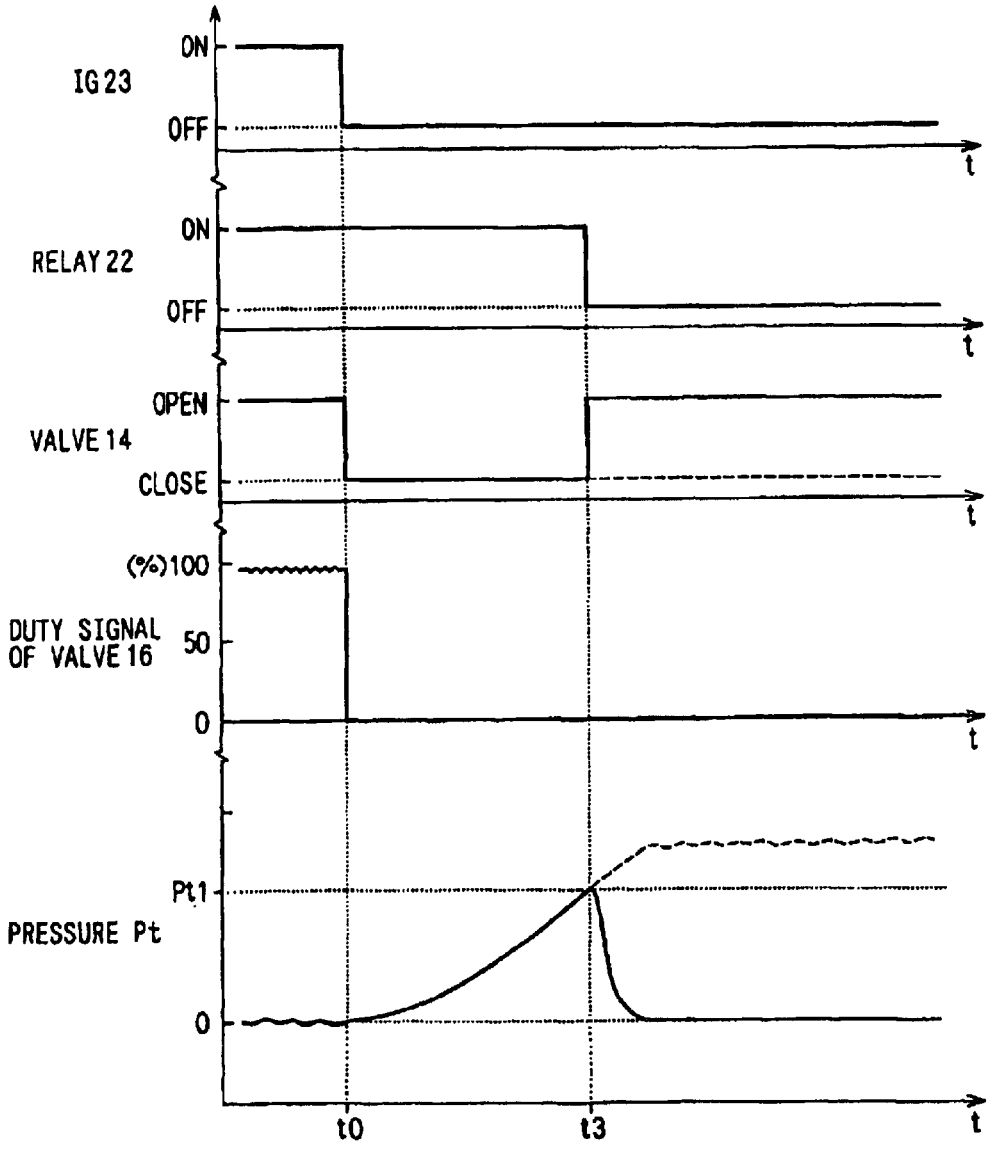
FIG. 13 is a time chart showing a leak check procedure according to the first and second embodiments of the invention.

However, as in a comparative example shown in FIG. 13 by a broken line, after finishing to check the leak (after making main relay OFF) in stopping the engine, when the canister valve is closed successively and the fuel vapor purge system is maintained in the hermetically closed state, by rise of the pressure accompanied by generating fuel vapor or fall of the pressure accompanied by temperature drop, there is a concern of increasing pressure load applied on the fuel vapor purge system in stopping the engine.

In this respect, according to the above-described respective first and second embodiments, as shown in FIG. 13 by a bold line, in finishing to check the leak in stopping the engine, the hermetically closed state of the fuel vapor purge system is released by opening the canister valve 14 and therefore, the pressure (pressure of fuel vapor purge system) can be set to a vicinity of the atmospheric pressure in finishing to check the leak in stopping the engine to thereby enable to alleviate pressure load applied on the fuel vapor purge system and a factor of causing the leak can be reduced. Further, when the canister valve 14 is opened in finishing to check the leak in stopping the engine, there can be prevented also a failure of fixing the canister valve 14 in the valve closing state in stopping the engine.

(Third Embodiment)

Figure 14:
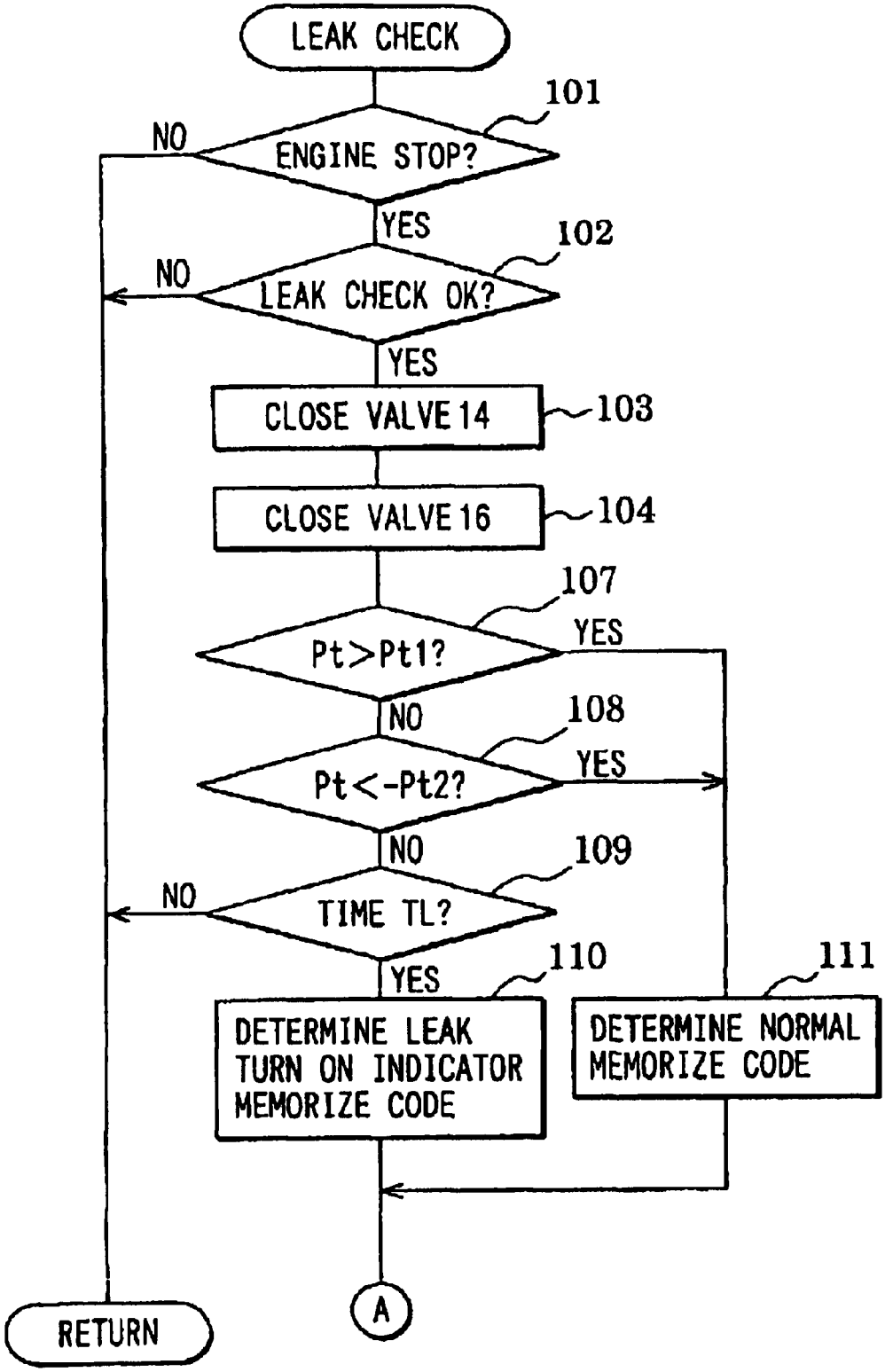
FIG. 14 is a flowchart showing leak check processings of a fuel vapor purge system according to a third embodiment of the invention.

An explanation will be given of a third embodiment in reference to FIG. 14 through FIG. 16 as follows. A fuel vapor purge system according to the third embodiment is provided with components the same as those of the first embodiment. Leak check processings of the third embodiment differ from those of the first embodiment. According to the third embodiment, there is added a processing of temporary opening the canister valve 14 after finishing to check the leak. In the following explanation, elements the same as or similar to those of the first embodiment are added with the same notations and an explanation thereof will not be repeated.

Meanwhile, according to a conventional general fuel vapor purge system, there is used an electromagnetic valve of a normally open type for the canister valve in order to communicate the canister to the atmosphere in stopping to operate the engine and therefore, even after stopping to operate the engine, until finishing to check the leak, in order to maintain the canister valve in the valve closing state, the electricity is obliged to continue to conduct to the canister valve, a power consumption amount in stopping to operate the engine is increased by that amount, as a result, dissipation of the battery (lowering of voltage) is accelerated.

Hence, it is conceivable to enable to maintain the fuel vapor purge system in the hermetically closed state by maintaining the canister valve in the valve closing state without conducting electricity to the canister valve in the leak check time period after stopping to operate the engine by constituting the canister valve by an electromagnetic valve of a normally closed type.

However, in this case, even after finishing to check the leak in stopping to operate the engine, the canister valve is successively maintained in the valve closing state to thereby maintain the fuel vapor purge system in the hermetically closed state. When outside air temperature is high in summer time or the like, there is a case in which even in stopping to operate the engine, the fuel temperature (pressure) is not so much lowered and therefore, when the fuel vapor purge system is maintained in the hermetically closed state over a long period of time after finishing to check the leak, there is a case in which the fuel vapor purge system is maintained in a state of pressure higher than the atmospheric pressure for a long period of time, which causes to be liable to bring about the leak of the fuel vapor purge system.

Further, in the case of using an electromagnetic valve of a normally open type as a canister valve, when electricity conduction to the canister valve is made OFF after finishing to check the leak, the canister valve is opened to thereby open the fuel vapor purge system to the atmosphere and therefore, after finishing to check the leak, the pressure is maintained to the atmospheric pressure, also in this case, when even a small hole is opened in the fuel vapor purge system, it is unavoidable that fuel vapor in the fuel vapor purge system leaks out from the hole.

Hence, according to the embodiment, when the leak check is finished, the pressure Pt is lowered. According to the processing, by temporarily opening the canister valve 14 to thereby release the hermetically close system of the fuel vapor purge system, the pressure Pt which has been increased by generating fuel vapor in checking the leak, is swiftly lowered to a vicinity of the atmospheric pressure. Thereafter, the canister valve 14 is closed again to thereby return the fuel vapor purge system to the hermetically closed state. As a result, by lowering the pressure Pt accompanied by lowering the fuel temperature thereafter, the pressure Pt is reduced to pressure lower than the atmospheric pressure (negative pressure) in a short period of time. Thereafter, the fuel vapor purge system is maintained at negative pressure and therefore, even when the very small hole is assumedly opened in the fuel vapor purge system, only the atmosphere is sucked from the hole into the fuel vapor purge system and fuel vapor in the fuel vapor purge system can be prevented from leaking out into the atmosphere.

Leak check of the fuel vapor purge system explained above, is executed as follows by a leak check routine of FIG. 14 and FIG. 15.

Figure 15:
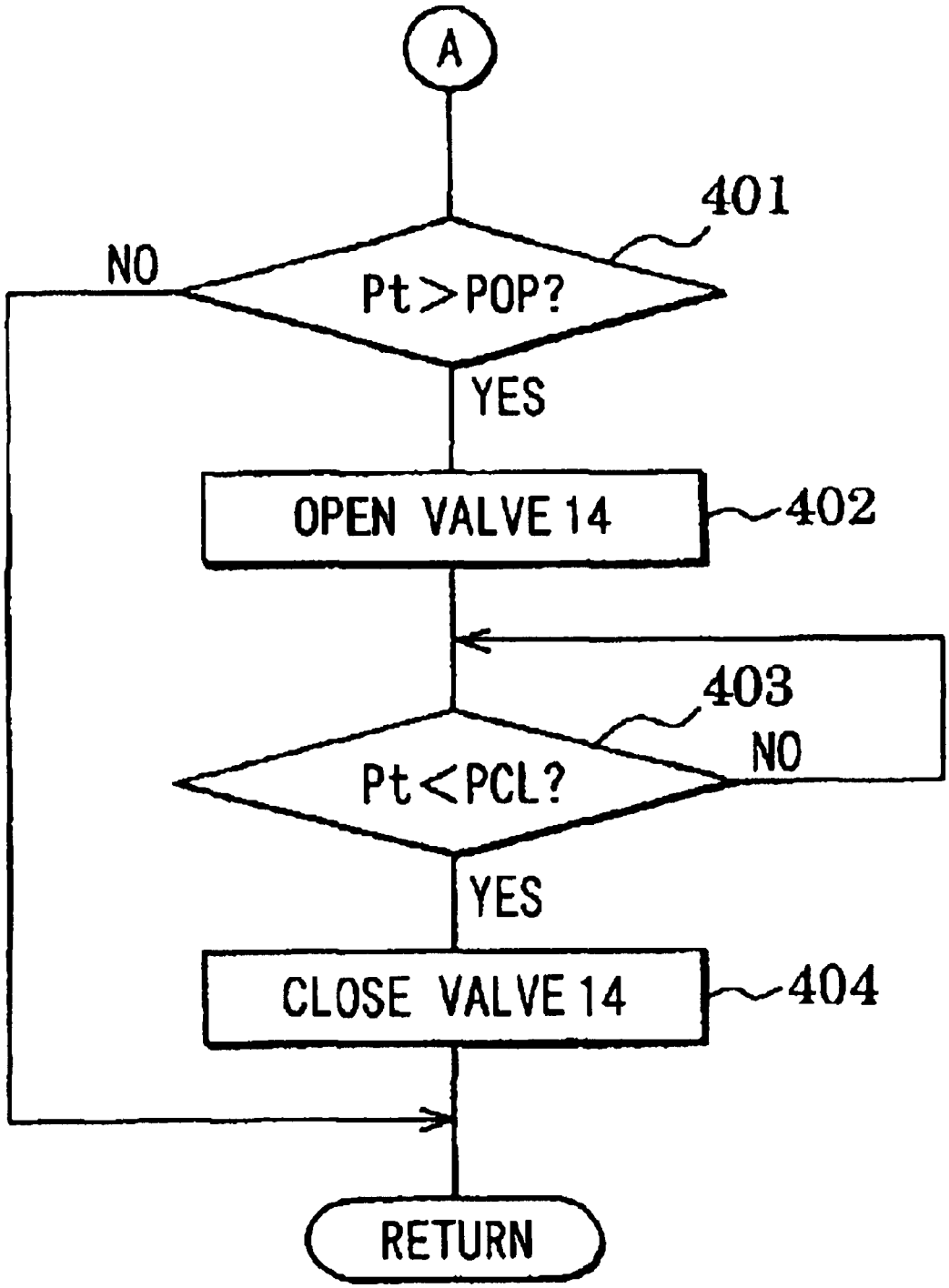
FIG. 15 is a flowchart showing leak check processings of the fuel vapor purge system according to the third embodiment of the invention.

When leak check is finished by processings of steps 101 through FIG. 111, the operation proceeds to step 401 of FIG. 15.

In step 401 of FIG. 15, it is determined whether the pressure Pt is higher than a predetermined valve opening determinant POP. The valve opening determinant POP is set to pressure slightly higher than the atmospheric pressure. When it is determined that the pressure Pt is higher than the valve opening determinant POP at step 401, the operation proceeds to step 402, and the canister valve 14 is opened by conducting drive current in the valve opening direction to the solenoid coil 39. Thereby, the hermetically closed state of the fuel vapor purge system is released and the pressure Pt which has been increased by generating fuel vapor in checking the leak, is reduced to a vicinity of the atmospheric pressure swiftly after finishing to check the leak.

Thereafter, the operation proceeds to step 403, it is determined whether the pressure Pt is lower than a predetermined valve closing determinant PCL. The valve closing determinant PCL is set to pressure at a vicinity of the atmospheric pressure (however, atmospheric pressure<PCL<POP). At the step 403, at a time point at which it is determined that the pressure Pt is lower than the valve closing determinant PCL, the operation proceeds to step 404 and the canister valve 14 is closed by conducting again drive current in the valve closing direction to the solenoid coil 39 of the canister valve 14. Thereby, the fuel vapor purge system is returned to the hermetically closed state and the pressure Pt is lowered to be equal to or lower than the atmospheric pressure (negative pressure) swiftly by utilizing lowering of the pressure Pt accompanied by lowering of fuel temperature thereafter.

In contrast thereto, in the step 401, when it is determined that the pressure Pt is equal to or lower than the valve opening determinant POP, since the pressure Pt has already been lowered to be equal to or lower than the valve opening determinant POP (pressure near to atmospheric pressure), it is determined that it is not necessary to open the canister valve 14 and the routine is finished while the canister valve 14 stays to be closed without being opened.

Also according to the third embodiment, there is executed a relay control similar to that of the first embodiment. However, according to the third embodiment, the leak check processing includes the control of opening and closing the canister valve 14. Therefore, the relay 22 is maintained to be ON until finishing the processings of steps 401 through 404 of FIG. 15.

Figure 16:
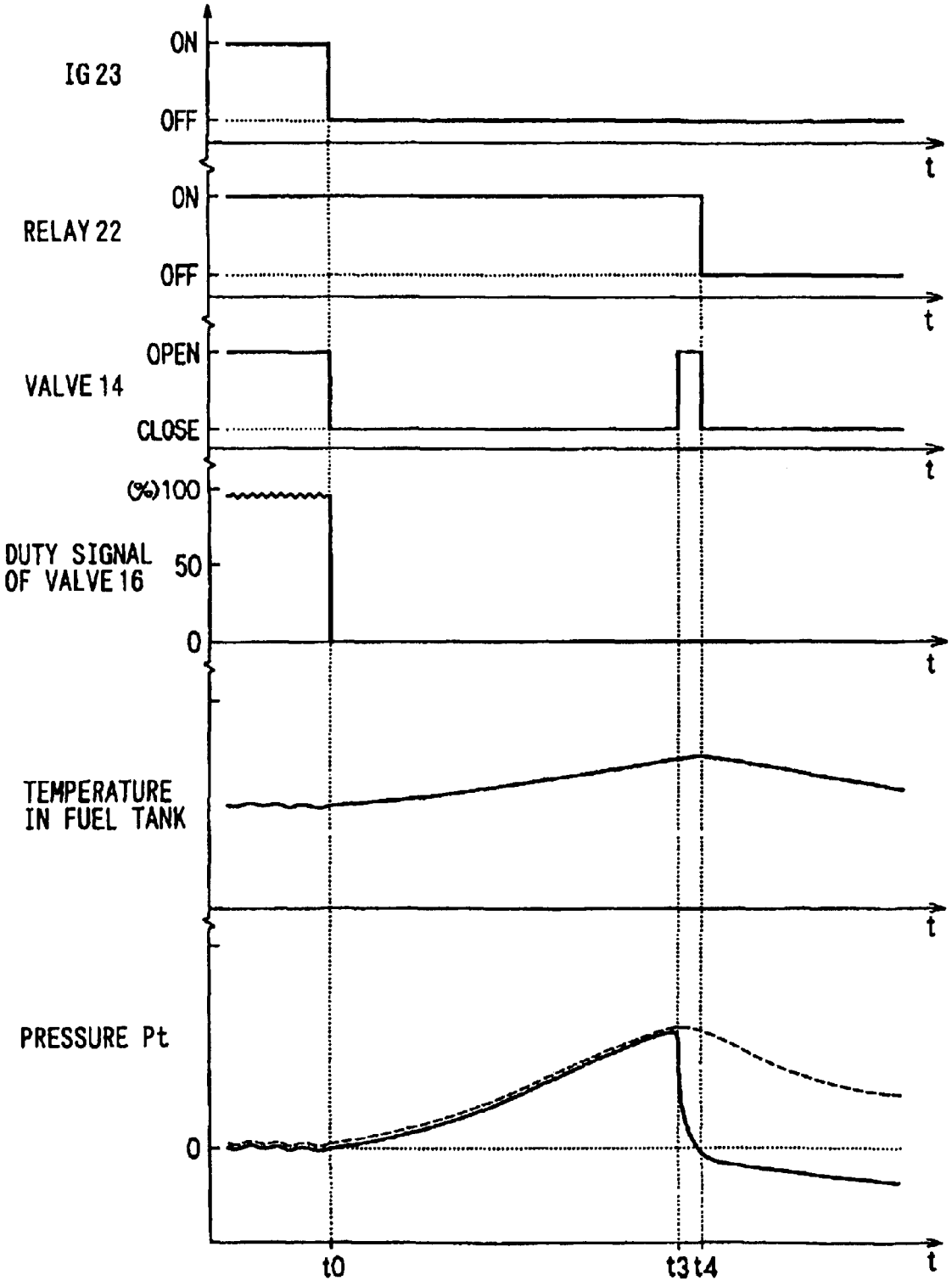
FIG. 16 is a time chart showing a leak check procedure according to the third embodiment of the invention.

FIG. 16 is a time chart showing an example of a control according to the third embodiment. Leak check is started from time t0. Even after stopping the engine, temperature at inside of the fuel tank is slightly elevated. During the leak check, the pressure Pt is gradually increased. When the leak check processing has been finished at time t3, the canister valve 14 is temporarily opened. The pressure Pt is rapidly lowered. According to the third embodiment, the pressure Pt is lowered to a vicinity of the atmospheric pressure (indicated by 0). At time t4, all the leak check processing is finished and the relay 22 is cut. After time t4, temperature at inside of the fuel tank is gradually lowered. Also the pressure Pt at inside of the fuel tank is gradually lowered. As a result, the pressure Pt at inside of the fuel tank is maintained at a vicinity of the atmospheric pressure or negative pressure equal to or lower than the atmospheric pressure.

According to the embodiment explained above, after finishing to check the leak in stopping the engine, the pressure Pt can swiftly be reduced to negative pressure. Thereafter, the fuel vapor purge system is maintained at negative pressure and therefore, when a very small hole is assumedly opened in the fuel vapor purge system, only the atmosphere is sucked from the hole into the fuel vapor purge system, fuel vapor in the fuel vapor purge system can be prevented from leaking out into the atmosphere and an amount of leaking fuel vapor can be reduced.

Further, according to the embodiment, the canister valve 14 is closed after confirming that the pressure Pt is actually lowered to the valve closing determinant PCL after opening the canister valve 14 in finishing to check the leak and therefore, the pressure Pt (pressure of fuel vapor purge system) can be reduced to negative pressure swiftly and firmly.

Further, according to the embodiment, the canister valve 14 is prevented from being opened when the pressure Pt is equal to or lower than the valve opening determinant POP in finishing to check the leak and therefore, when the pressure Pt has already been lowered to be equal to the lower than the valve opening determinant POP in finishing to check the leak, the canister valve 14 can be made to be closed without being opened and in finishing to check the leak, it is not necessary to carry out wasteful control of opening and closing the canister valve 14 and power consumption in stopping to operate the engine can be saved by that amount.

Further, although according to the above-described embodiment, there is used the canister valve 14 of the power saving type capable of maintaining the valve closing state by utilizing negative pressure, the canister valve may be constituted by an electromagnetic valve of a power saving type by conducting electricity thereto only in switching to open the valve/close the valve and maintaining the valve opening state/the valve closing state successively by a permanent magnet or the like even after cutting electricity conduction. In this case, when electricity is conducted to the canister valve to close in starting to check the leak after stopping the engine, the fuel vapor purge system can be maintained in the hermetically closed state by maintaining the canister valve in the valve closing state without conducting electricity thereafter and therefore, it is not necessary to conduct electricity to the canister valve in a time period of checking the leak and the power consumption amount in the leak checking time period can be reduced by that amount.

Or, the canister valve may be constituted by an electromagnetic valve of a normally closed type. Also in this case, when power supply to the canister valve is cut by making the main relay 22 OFF at a time point of finishing to operate to open and close the canister valve in finishing to check the leak, the canister valve can be opened.

Further, although according to the above-described embodiment, presence or absence of leak is determined by comparing the pressure Pt with the positive pressure side determinant Pt1 and the negative pressure side determinant −Pt2 during the leak checking time period, the method of leak check may pertinently be modified.

For example, presence or absence of leak may be determined by comparing a summed pressure value calculated by summing the pressure by a predetermined operation period in the leak checking time period with a leak determinant.

Or, presence or absence of leak may be determined by checking a maximum value (or minimum value) of the pressure during the leak checking time period and comparing the maximum value (or minimum value) of the pressure with a leak determinant.

Or, presence or absence of leak may be determined by comparing the pressure detected after elapse of a predetermined time period from starting to check the leak (hermetically closing fuel vapor purge system) with a leak determinant.

Or, presence or absence of leak may be determined by monitoring a change in the pressure after starting to check the leak, measuring a time period until a rate of increasing the pressure becomes equal to or smaller than a predetermined value (for example, substantially null) and by whether the time period is shorter than a leak determinant.

Or, presence or absence of leak may be determined by whether the pressure is lowered to be equal to or smaller than predetermined pressure (for example, vicinity of atmospheric pressure) before elapse of a predetermined time period from starting to check the leak. Further, the processings of steps 401 though 404 of the third embodiment may be combined with the first embodiment or the second embodiment.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. An apparatus of checking a leak in a fuel vapor purge system comprising:

pressure detecting means for detecting a pressure of a fuel vapor purge system including a fuel tank;

leak checking means for checking presence or absence of the leak in the fuel vapor purge system based on the pressure of the fuel vapor purge system detected by the pressure checking means when the fuel vapor purge system is maintained in a hermetically closed state;

erroneous check avoiding means for avoiding an erroneous check caused by a deformation of the fuel tank;

restricting means for restricting the pressure of the fuel vapor purge system into a predetermined restricted value when the leak checking means checks the leak;

temperature determining means for determining a temperature in the fuel tank or a temperature around the fuel tank or information related thereto; and means for changing the restricted value based on the temperature determined by the temperature determining means.

2. The apparatus of checking a leak of a fuel vapor purge system according to claim 1, wherein the restricting means restricts increase of the pressure.

3. An apparatus of checking a leak in a fuel vapor purge system comprising:

pressure detecting means for detecting a pressure of a fuel vapor purge system including a fuel tank;

leak checking means for checking presence or absence of the leak in the fuel vapor purge system based on the pressure of the fuel vapor purge system detected by the pressure checking means when the fuel vapor purge system is maintained in a hermetically closed state;

erroneous check avoiding means for avoiding an erroneous check caused by a deformation of the fuel tank;

restricting means for restricting the pressure of the fuel vapor purge system into a predetermined restricted value when the leak checking means checks the leak; and means for correcting the restricted value in a direction of approaching an atmospheric pressure when the pressure of the fuel vapor purge system detected by the pressure detecting means is rapidly changed in checking the leak by the leak checking means.

4. The apparatus of checking a leak of a fuel vapor purge system according to claim 3, wherein the restricting means restricts increase of the pressure.

5. An apparatus of checking a leak of a fuel vapor purge system which is a fuel vapor purge system for purging fuel vapor generated by evaporating a fuel in a fuel tank to an intake system of an engine, said apparatus comprising:

pressure detecting means for detecting a pressure of the fuel vapor purge system including the fuel tank;

a first valve for opening and closing an atmosphere communicating path of the fuel vapor purge system;

leak checking means for checking presence or absence of a leak of the fuel vapor purge system based on the pressure detected by the pressure detecting means when at least the first valve is closed to thereby maintain the fuel vapor purge system in a hermetically closed state in stopping to operate the engine; and valve controlling means for temporarily releasing the hermetically closed state of the fuel vapor purge system by temporarily opening the first valve after finishing to check the leak and thereafter closing the first valve again.

6. The apparatus of checking a leak of a fuel vapor purge system according to claim 5, wherein the valve controlling means closes the first valve at a time point at which the pressure detected by the pressure detecting means becomes lower than a predetermined determinant when the first valve is opened after finishing to check the leak.

7. The apparatus of checking a leak of a fuel vapor purge system according to claim 5, wherein the valve controlling means does not open the first valve when the pressure detected by the pressure detecting means becomes equal to or smaller than a predetermined determinant in finishing to check the leak.

8. A method of checking a leak in a fuel vapor purge system, the method comprising:

detecting a pressure of a fuel vapor purge system including a fuel tank;

checking presence or absence of a leak in the fuel vapor purge system based on the detected pressure of the fuel vapor purge system when the fuel vapor purge system is maintained in a hermetically closed state;

avoiding an erroneous check caused by a deformation of the fuel tank;

restricting the pressure of the fuel vapor purge system into a predetermined restricted value when the leak is checked;

determining a temperature in the fuel tank or a temperature around the fuel tank; and changing the restricted value based on the determined temperature.

9. The method of checking a leak of a fuel vapor purge system according to claim 8, wherein restricting the pressure of the fuel vapor purge system includes restricting an increase of the pressure.

10. A method of checking a leak in a fuel vapor purge system, the method comprising:

detecting a pressure of a fuel vapor purge system including a fuel tank;

checking presence or absence of a leak in the fuel vapor purge system based on the detected pressure of the fuel vapor purge system when the fuel vapor purge system is maintained in a hermetically closed state;

avoiding an erroneous check caused by a deformation of the fuel tank;

restricting the pressure of the fuel vapor purge system into a predetermined restricted value when the leak is checked; and corrected the restricted value in a direction of approaching an atmospheric pressure when the detected pressure is rapidly changed in the checking of the leak.

11. The method of checking a leak of a fuel vapor purge system according to claim 10, wherein restricting the pressure of the fuel vapor purge system includes restricting an increase of the pressure.

12. A method of checking a leak of a fuel vapor purge system which is a fuel vapor purge system for purging fuel vapor generated by evaporating a fuel in a fuel tank to an intake system of an engine, said method comprising:

detecting a pressure of the fuel vapor purge system including the fuel tank;

opening and closing an atmosphere communicating path of the fuel vapor purge system via a first valve;

checking presence or absence of a leak of the fuel vapor purge system based on the detected pressure when at least the first valve is closed to thereby maintain the fuel vapor purge system in a hermetically closed state in stopping to operate the engine; and temporarily releasing the hermetically closed state of the fuel vapor purge system by temporarily opening the first valve after finishing to check the leak and thereafter closing the first valve again.

13. The method of checking a leak of a fuel vapor purge system according to claim 12, wherein the first valve is closed at a time point at which the detected pressure becomes lower than a predetermined determinant when the first valve is opened after finishing to check the leak.

14. The method of checking a leak of a fuel vapor purge system according to claim 12, wherein the first valve is not opened when the detected pressure becomes equal to or smaller than a predetermined determinant in finishing to check the leak.

*15. An apparatus of checking a leak in a fuel vapor purge system for an internal combustion engine comprising:*

*a first valve for opening and closing an atmosphere communicating path of the fuel vapor purge system;*

*leak checking means for checking the presence or absence of a leak in the fuel vapor purge system based on a pressure in the fuel vapor purge system when the fuel vapor purge system is in a hermetically closed state with the first valve closed while the engine is stopped; and*

*valve control means for temporarily releasing the hermetically closed state of the fuel vapor purge system by temporarily opening the first valve after finishing checking the leak and thereafter closing the first valve again.*

*16. The apparatus of checking a leak in a fuel vapor purge system for an internal combustion engine according to claim 15, wherein the valve control means closes the first valve at a time point at which the pressure in the fuel vapor purge system becomes lower than a predetermined determinant when the first valve is opened after finishing checking the leak.*

*17. The apparatus of checking a leak in a fuel vapor purge system for an internal combustion engine according to claim 15, wherein the valve control means does not open the first valve when the pressure in the fuel vapor purge system becomes equal to or smaller than a predetermined determinant in finishing checking the leak.*

*18. The apparatus of checking a leak in a fuel vapor purge system for an internal combustion engine according to claim 15, wherein the leak checking means checks whether the pressure is lowered to be equal to or smaller than a predetermined pressure.*

*19. A method of checking a leak in a fuel vapor purge system for an internal combustion engine, the method comprising:*

*stopping the internal combustion engine;*

*hermetically closing the fuel vapor purge system by closing a first valve that opens and closes an atmosphere communicating path of the fuel vapor purge system;*

*checking the presence or absence of a leak in the fuel vapor purge system based on a pressure in the fuel vapor purge system;*

*temporarily opening the first valve after finishing checking the leak; and*

*closing the first valve again.*

*20. The method of checking a leak in a fuel vapor purge system for an internal combustion engine according to claim 19, wherein the first valve is closed at a time point at which the pressure in the fuel vapor purge system becomes lower than a predetermined determinant when the first valve is opened after finishing checking the leak.*

*21. The method of checking a leak in a fuel vapor purge system for an internal combustion engine according to claim 19, wherein the first valve is not opened when the pressure in the fuel vapor purge system becomes equal to or smaller than a predetermined determinant in finishing checking the leak.*

*22. The method of checking a leak in a fuel vapor purge system for an internal combustion engine according to claim 19, wherein checking the presence or absence of a leak in the fuel vapor purge system includes checking whether the pressure is lowered to be equal to or smaller than a predetermined pressure.*

*23. An apparatus of checking a leak in a fuel vapor purge system for an internal combustion engine comprising:*

*a first valve for opening and closing an atmosphere communicating path of the fuel vapor purge system; and*

*leak checking means for checking the presence or absence of a leak in the fuel vapor purge system based on a pressure in the fuel vapor purge system when the fuel vapor purge system is in a hermetically closed state with the first valve closed while the engine is stopped;*

*wherein the leak checking means checks a leak when a condition that fuel vapor is liable to generate at a time when the engine is stopped is satisfied.*

*24. The apparatus of checking a leak in a fuel vapor purge system for an internal combustion engine according to claim 23, wherein the condition is that a fuel temperature is equal to or higher than a predetermined temperature.*

*25. The apparatus of checking a leak in a fuel vapor purge system for an internal combustion engine according to claim 23, wherein the condition is that an engine running time is equal to or longer than a predetermined time before the engine is stopped.*

*26. The apparatus of checking a leak in a fuel vapor purge system for an internal combustion engine of a vehicle according to claim 23, wherein the condition is that a running distance of the vehicle is equal to or larger than a predetermined value before the engine is stopped.*

*27. A method of checking a leak in a fuel vapor purge system for an internal combustion engine, the method comprising:*

*stopping the internal combustion engine;*

*hermetically closing the fuel vapor purge system by closing a first valve that opens and closes an atmosphere communicating path of the fuel vapor purge system; and*

*checking the presence or absence of a leak in the fuel vapor purge system based on a pressure in the fuel vapor purge system;*

*wherein the leak is checked when a condition that fuel vapor is liable to generate at a time when the engine is stopped is satisfied.*

*28. The method of checking a leak in a fuel vapor purge system for an internal combustion engine according to claim 27, wherein the condition is that a fuel temperature is equal to or higher than a predetermined temperature.*

*29. The method of checking a leak in a fuel vapor purge system for an internal combustion engine according to claim 27, wherein the condition is that an engine running time is equal to or longer than a predetermined time before the engine is stopped.*

*30. The method of checking a leak in a fuel vapor purge system for an internal combustion engine according to claim 27, wherein the condition is that a running distance of the vehicle is equal to or larger than a predetermined value before the engine is stopped.*

* * * * *